(12) United States Patent
Watanabe et al.

(10) Patent No.: US 10,747,378 B2
(45) Date of Patent: Aug. 18, 2020

(54) DISPLAY DEVICE AND SENSOR DEVICE

(71) Applicant: Japan Display Inc., Tokyo (JP)

(72) Inventors: Yoshihiro Watanabe, Tokyo (JP);
Shuichi Osawa, Tokyo (JP);
Yoshikatsu Imazeki, Tokyo (JP);
Yoichi Kamijo, Tokyo (JP)

(73) Assignee: Japan Display Inc., Tokyo (JP)

( * ) Notice: Subject to any disclaimer, the term of this patent is extended or adjusted under 35 U.S.C. 154(b) by 107 days.

(21) Appl. No.: 15/980,204

(22) Filed: May 15, 2018

(65) Prior Publication Data
US 2018/0335869 A1      Nov. 22, 2018

(30) Foreign Application Priority Data

May 16, 2017  (JP) .................... 2017-097194
Jan. 4, 2018  (JP) .................... 2018-000219

(51) Int. Cl.
| G06F 3/041 | (2006.01) |
| G06F 3/044 | (2006.01) |
| G02F 1/1343 | (2006.01) |
| G02F 1/1333 | (2006.01) |
| G02F 1/1345 | (2006.01) |

(52) U.S. Cl.
CPC .......... *G06F 3/044* (2013.01); *G02F 1/1345* (2013.01); *G02F 1/13338* (2013.01); *G02F 1/13439* (2013.01); *G02F 1/133345* (2013.01); *G06F 3/0412* (2013.01); *G06F 3/0416* (2013.01); *G02F 1/13452* (2013.01); *G02F 2001/133388* (2013.01); *G02F 2201/42* (2013.01); *G06F 2203/04101* (2013.01); *G06F 2203/04103* (2013.01); *G06F 2203/04111* (2013.01)

(58) Field of Classification Search
CPC .............................................. G06F 3/041–048
See application file for complete search history.

(56) References Cited

U.S. PATENT DOCUMENTS

| 2010/0328259 A1* | 12/2010 | Ishizaki | ................... G06F 3/044 |
| | | | 345/174 |
| 2013/0249820 A1* | 9/2013 | Woo | ........................ G06F 3/041 |
| | | | 345/173 |
| 2013/0328812 A1* | 12/2013 | Kim | ........................ G06F 3/044 |
| | | | 345/173 |

FOREIGN PATENT DOCUMENTS

JP        2002-040465 A     2/2002

* cited by examiner

*Primary Examiner* — Roy P Rabindranath
(74) *Attorney, Agent, or Firm* — K&L Gates LLP

(57) ABSTRACT

According to one embodiment, a display device includes a first substrate, a second substrate, a display function layer, and a connecting material. The first substrate includes a first basement and a first conductive layer. The second substrate includes a second basement including a first hole, a first projection formed on an inner circumferential surface of the first hole, and a second conductive layer. The connecting material covers a surface of the first hole including the first projection and electrically connects the first conductive layer and the second conductive layer.

17 Claims, 16 Drawing Sheets

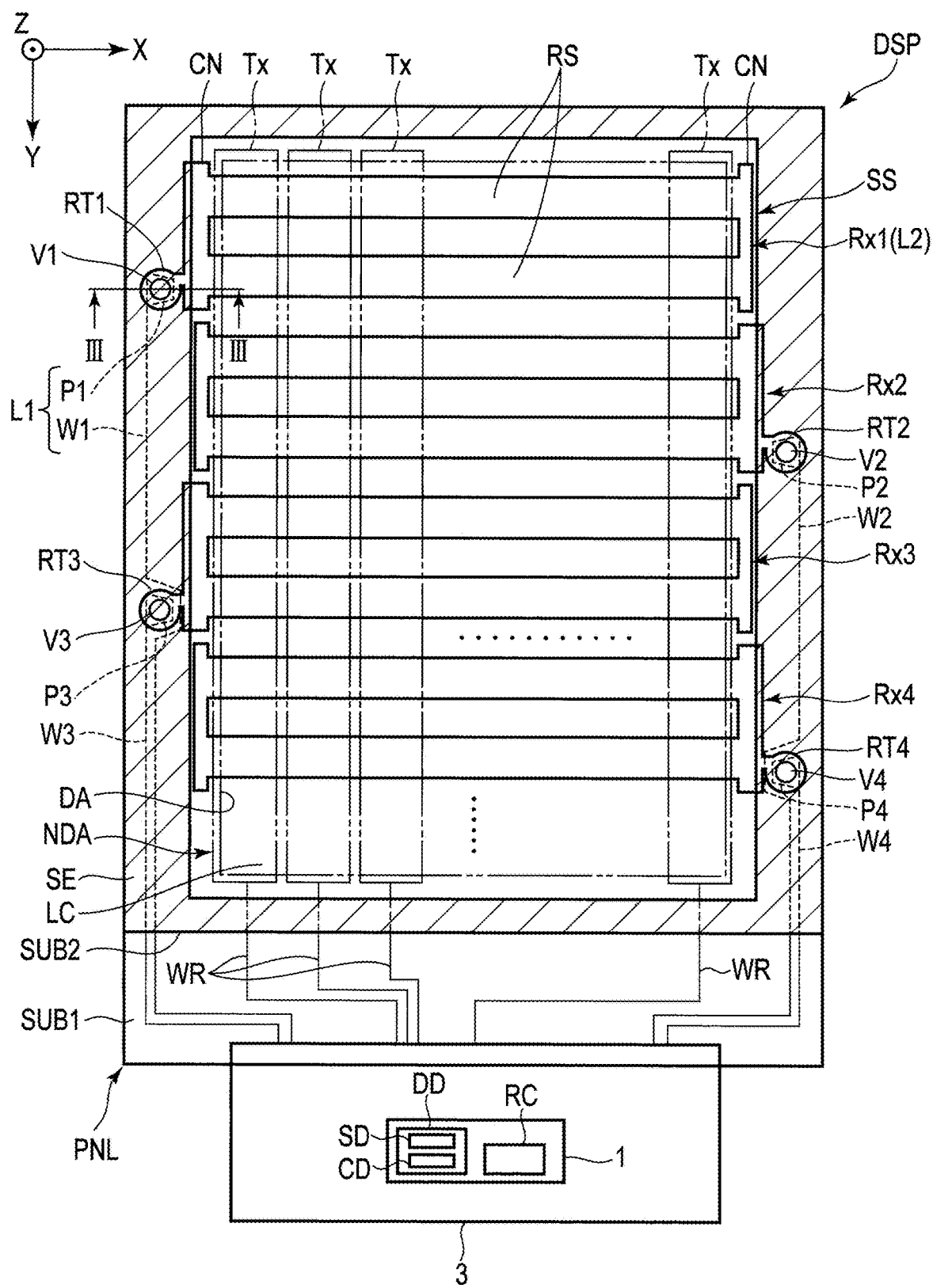
F I G. 1

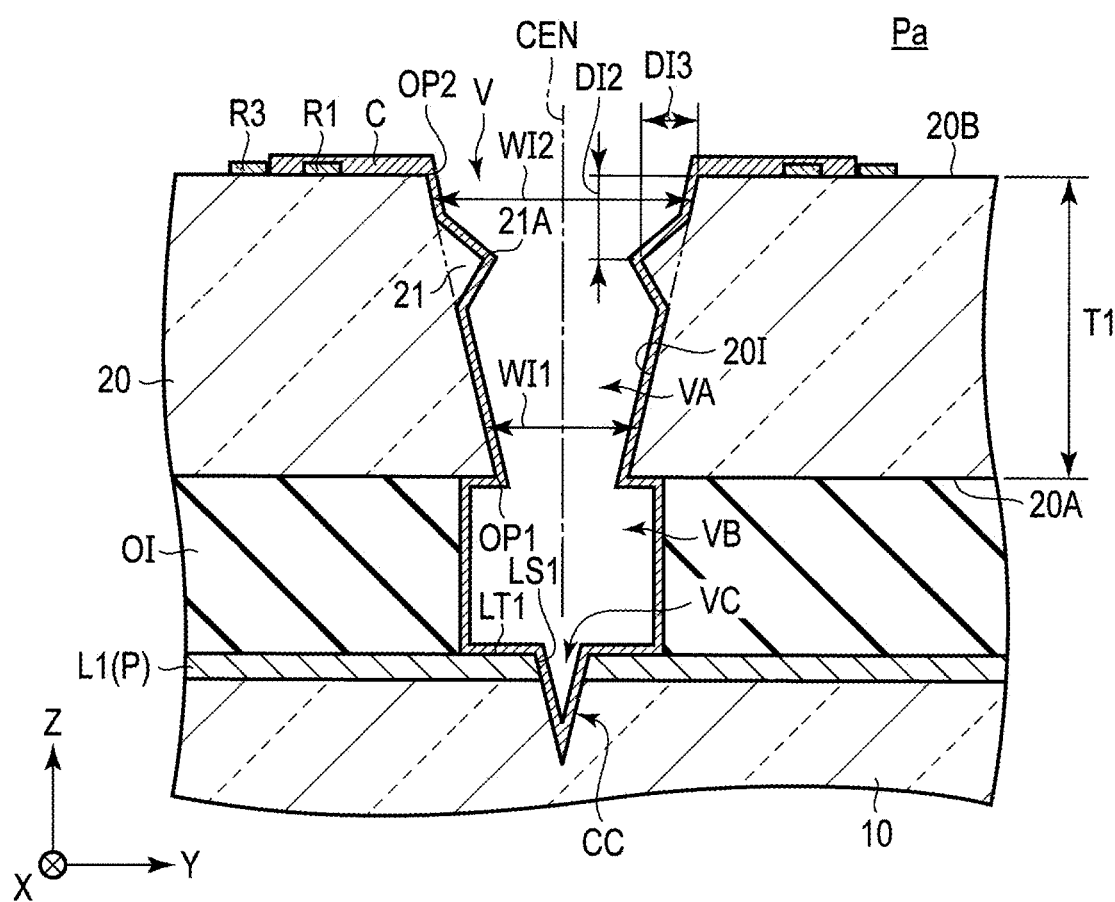
F I G. 5

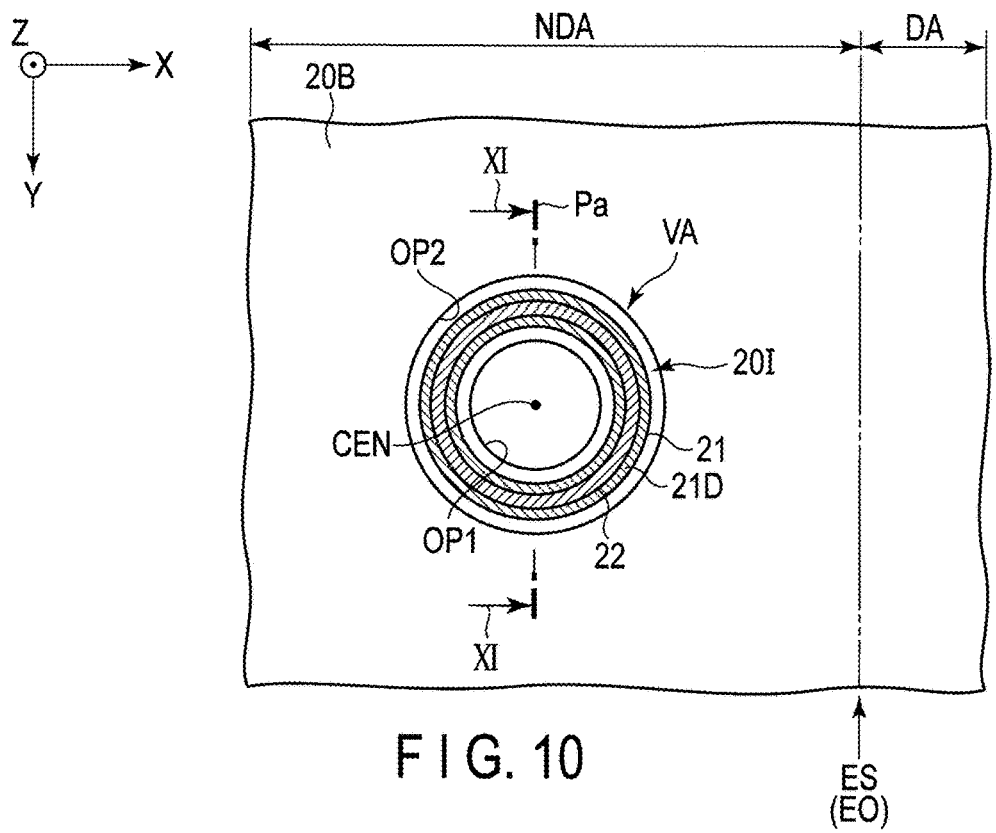
F I G. 10
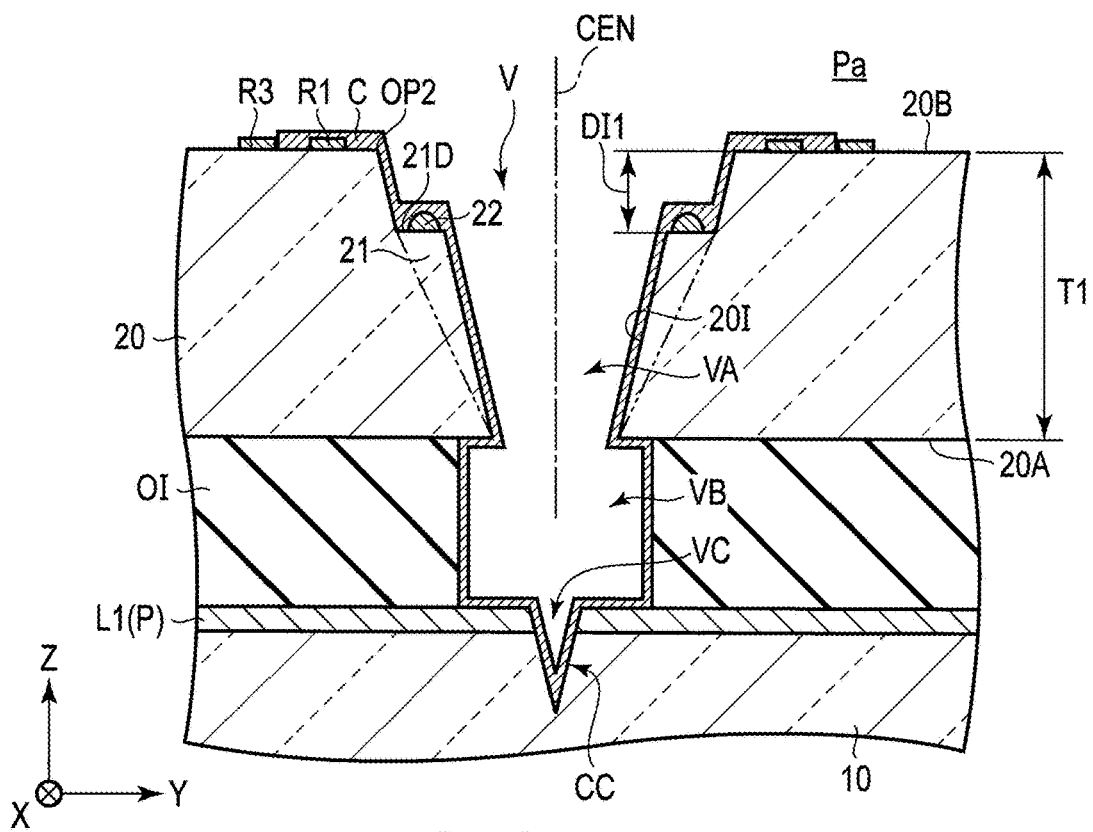
F I G. 11

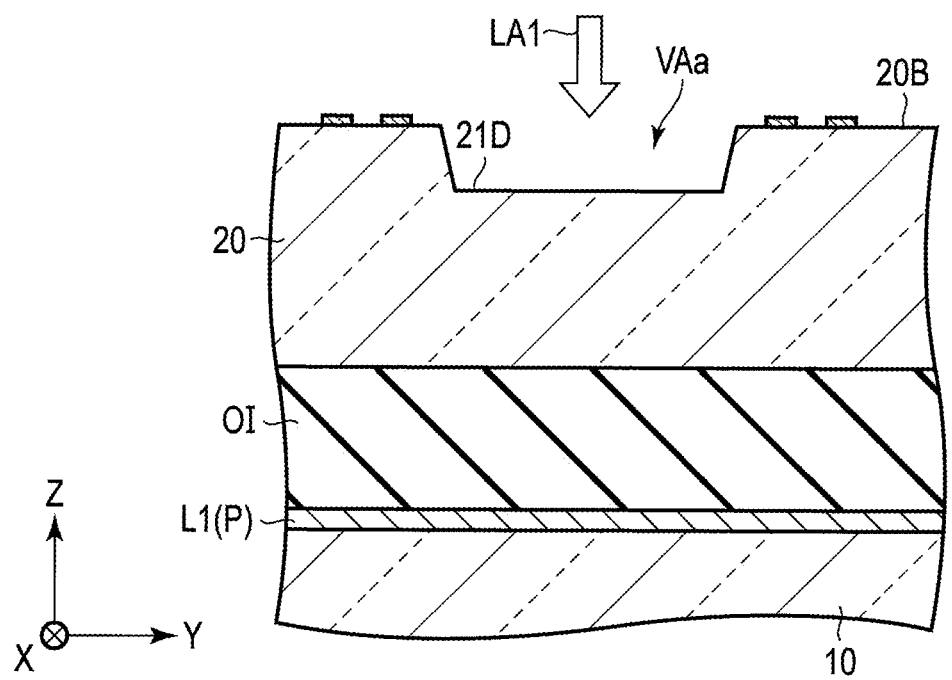
F I G. 12
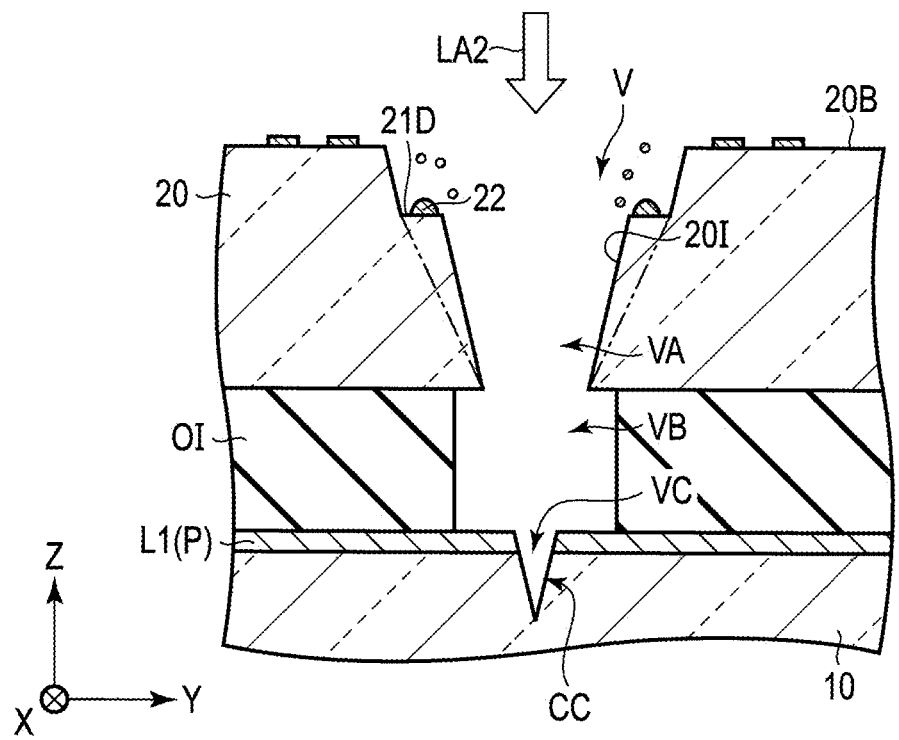
F I G. 13

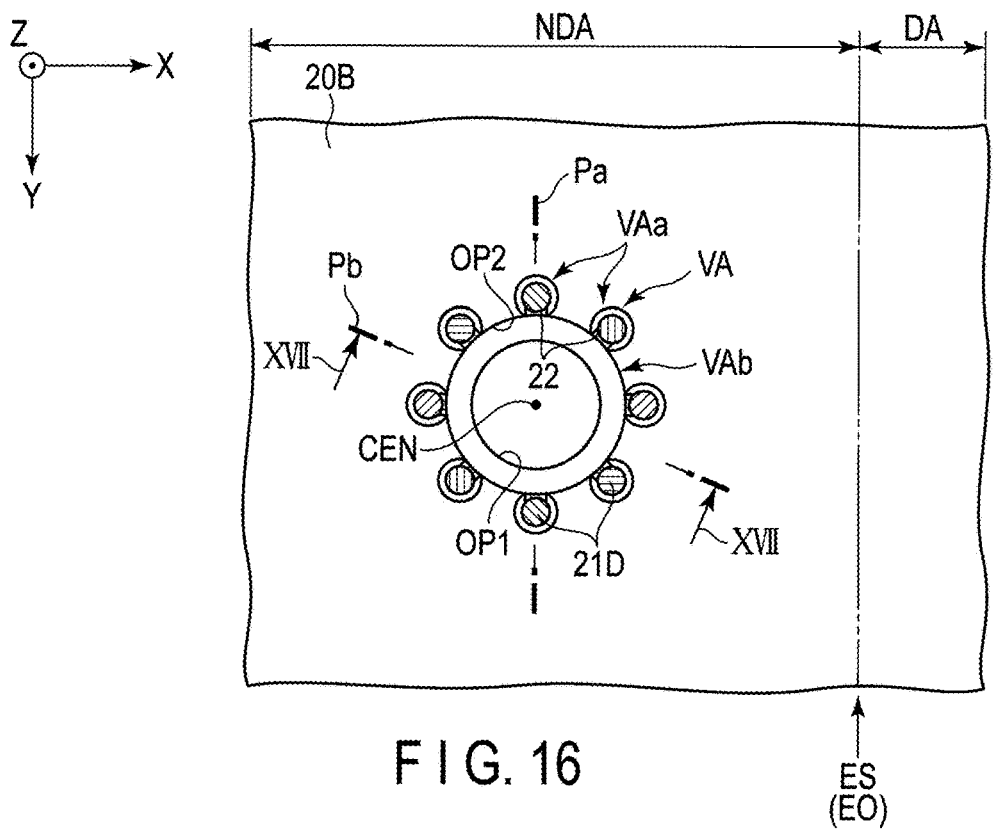
F I G. 16
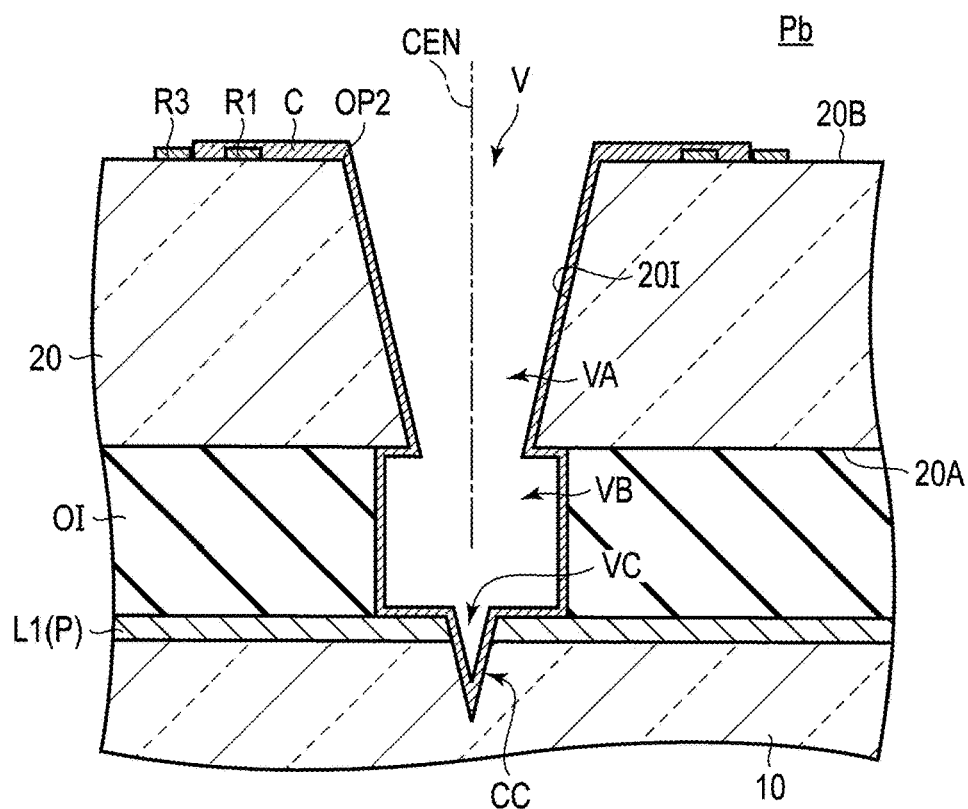
F I G. 17

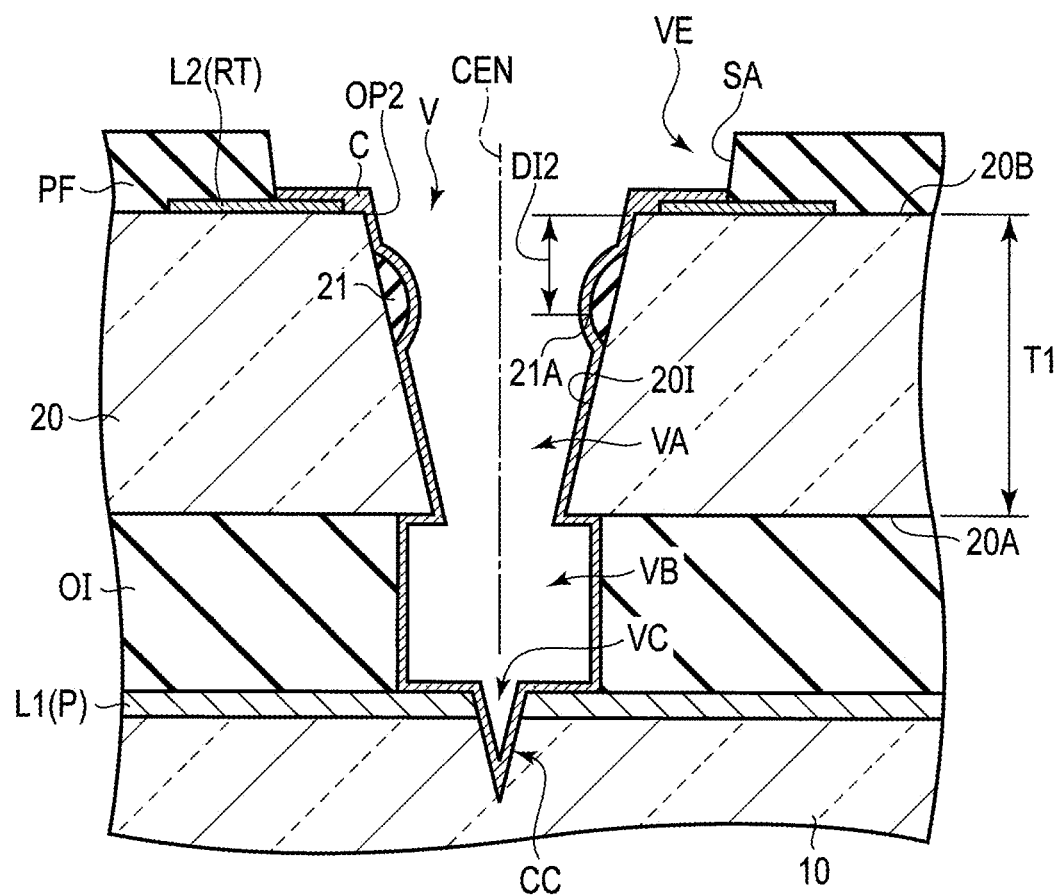
F I G. 20

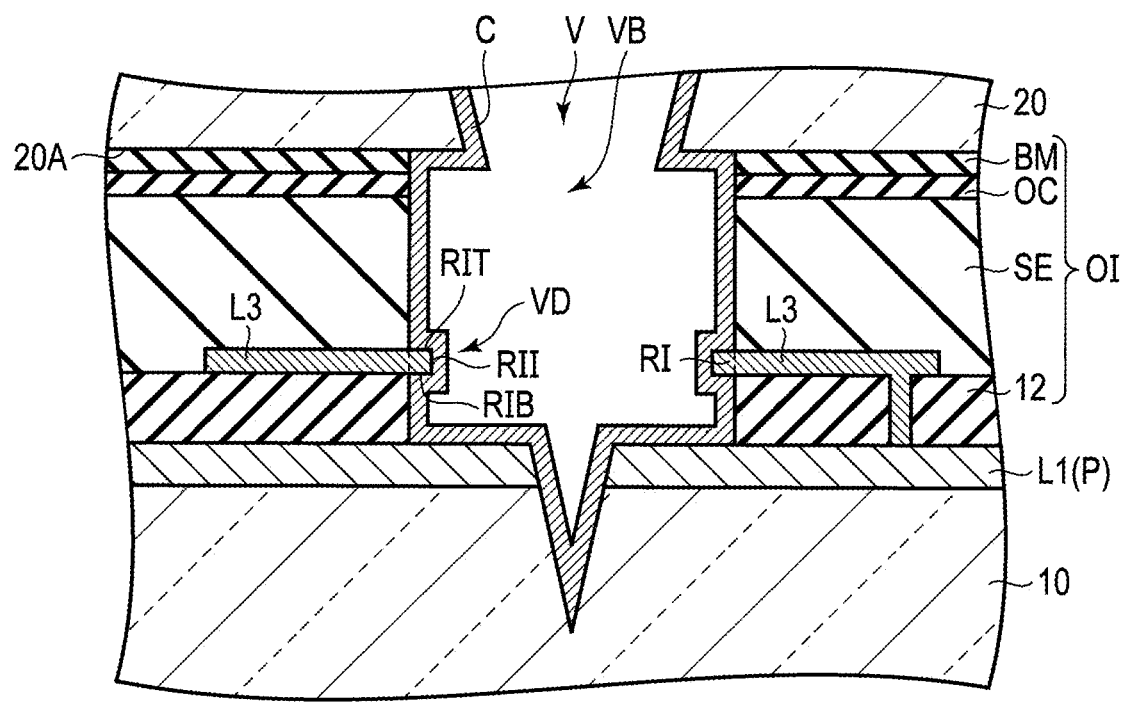
F I G. 22

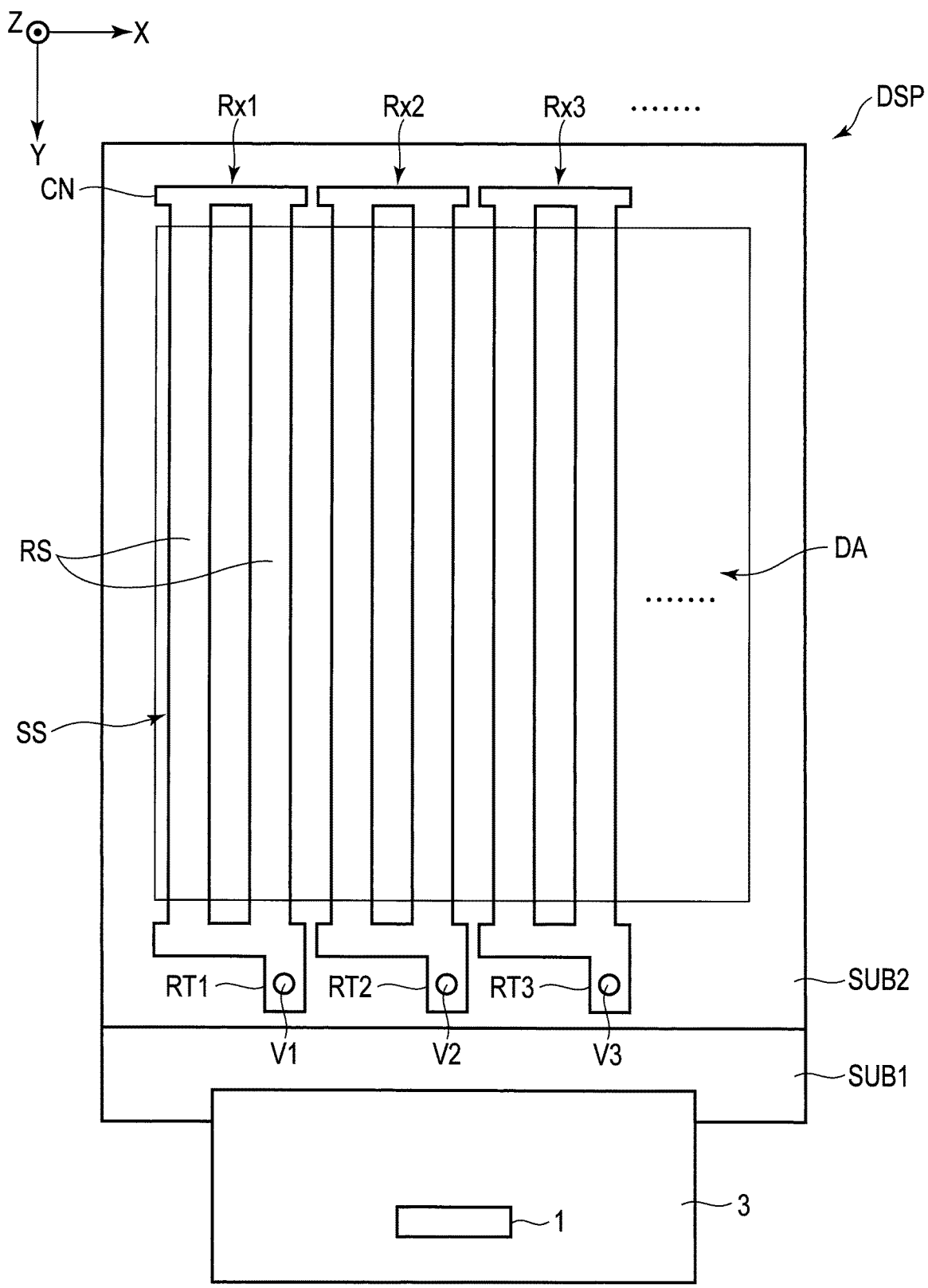
F I G. 23

DISPLAY DEVICE AND SENSOR DEVICE

CROSS-REFERENCE TO RELATED APPLICATIONS

This application is based upon and claims the benefit of priority from Japanese Patent Applications No. 2017-097194, filed May 16, 2017; and No. 2018-000219, filed Jan. 4, 2018, the entire contents of all of which are incorporated herein by reference.

FIELD

Embodiments described herein relate generally to a display device and a sensor device.

BACKGROUND

Recently, various types of techniques for reducing the width of the frame of a display device have been considered. For example, a technique for electrically connecting a wiring portion comprising an in-hole connecting portion inside a hole penetrating the inner and outer surfaces of a resinous first substrate and a wiring portion provided on the inner surface of a resinous second substrate with a substrate connecting portion is disclosed.

SUMMARY

The present application generally relates to a display device and a sensor device.

According to an embodiment, a display device comprising:
a first substrate comprising a first basement and a first conductive layer;
a second substrate comprising:
  a second basement including:
    a first surface facing the first conductive layer and located away from the first conductive layer;
    a second surface on a side opposite to the first surface; and
    a first hole penetrating a region from the second surface to the first surface;
  a first projection formed on an inner circumferential surface of the first hole; and
  a second conductive layer provided on the second surface;
a display function layer located between the first substrate and the second substrate; and
a connecting material which covers a surface of the first hole including the first projection and electrically connects the first conductive layer and the second conductive layer.

According to another embodiment, a sensor device comprising:
a first substrate comprising a first basement and a first conductive layer;
a second substrate comprising:
  a second basement including:
    a first surface facing the first conductive layer and located away from the first conductive layer;
    a second surface on a side opposite to the first surface; and
    a first hole penetrating a region from the second surface to the first surface;
  a first projection formed on an inner circumferential surface of the first hole; and
  a detection electrode provided on the second surface;
a transparent insulating layer located between the first substrate and the second substrate;
a connecting material which covers a surface of the first hole including the first projection and electrically connects the first conductive layer and the detection electrode; and
a detection circuit which reads a sensor signal output from the detection electrode.

BRIEF DESCRIPTION OF THE DRAWINGS

FIG. 1 is a plan view showing a structural example of a display device according to a first embodiment.

FIG. 5 is a cross-sectional view showing the display panel along the line V-V of FIG. 4.

FIG. 10 is a plan view showing a first hole and a second surface in a display device according to a second embodiment.

FIG. 11 is a cross-sectional view showing the display panel along the line XI-XI of FIG. 10.

FIG. 12 is shown for explaining a method for manufacturing the display device of the second embodiment, and shows a state in which a concavity is formed in a second basement by the first application of laser light to the second basement of the display panel while the display panel is manufactured.

FIG. 13 is shown for explaining the method for manufacturing the display device of the second embodiment after FIG. 12, and shows a state in which a contact hole is formed by the second application of laser light to the display panel while the display panel is manufactured.

FIG. 16 is a plan view showing the first hole and the second surface of the display device according to a modification example of the third embodiment.

FIG. 17 is a cross-sectional view showing the display panel along the line XVII-XVII of FIG. 16.

FIG. 20 is a cross-sectional view showing a part of a display panel in a display device according to a fifth embodiment.

FIG. 22 is a cross-sectional view showing another structural example of the display panel according to the first to fifth embodiments.

FIG. 23 is a plan view showing another structural example of the display device according to the first to fifth embodiments.

DETAILED DESCRIPTION

Figure 2:
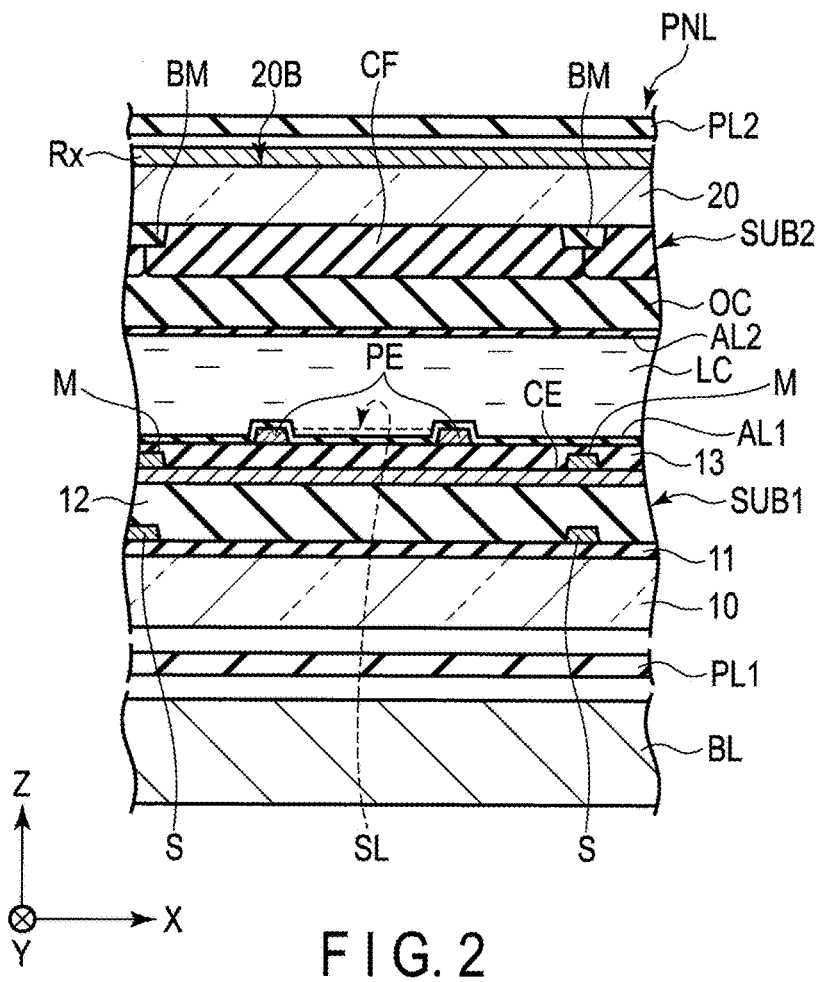
FIG. 2 is a cross-sectional view showing a display area in the display panel shown in FIG. 1.

In general, according to one embodiment, there is provided a display device comprising: a first substrate comprising a first basement and a first conductive layer; a second substrate comprising: a second basement including: a first surface facing the first conductive layer and located away from the first conductive layer; a second surface on a side opposite to the first surface; and a first hole penetrating a region from the second surface to the first surface; a first projection formed on an inner circumferential surface of the first hole; and a second conductive layer provided on the second surface; a display function layer located between the first substrate and the second substrate; and a connecting material which covers a surface of the first hole including the first projection and electrically connects the first conductive layer and the second conductive layer.

According to another embodiment, there is provided a sensor device comprising: a first substrate comprising a first basement and a first conductive layer; a second substrate comprising: a second basement including: a first surface facing the first conductive layer and located away from the first conductive layer; a second surface on a side opposite to the first surface; and a first hole penetrating a region from the second surface to the first surface; a first projection formed on an inner circumferential surface of the first hole; and a detection electrode provided on the second surface; a transparent insulating layer located between the first substrate and the second substrate; a connecting material which covers a surface of the first hole including the first projection and electrically connects the first conductive layer and the detection electrode; and a detection circuit which reads a sensor signal output from the detection electrode.

Embodiments will be described with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

The display device of each embodiment may be applied to various devices such as a smartphone, a tablet, a mobile phone, a notebook computer or a game console. The main structure disclosed in each embodiment can be applied to, for example, liquid crystal display devices, self-luminous display devices such as organic electroluminescent display devices, electronic paper display devices comprising an electrophoretic element, etc., display devices to which micro-electromechanical systems (MEMS) are applied, and display devices to which electrochromism is applied.

Each embodiment shown below may be applied to various display devices and sensor devices comprising the following substrate conductive structure. In the substrate conductive structure, a first basement is spaced from a second basement. The second basement comprises a hole. A first conductive layer located in the first basement is electrically connected to a second conductive layer located in the second basement via the hole.

First Embodiment

A first embodiment is explained. FIG. 1 is a plan view showing an example of a display device DSP according to the first embodiment. A first direction X, a second direction Y and a third direction Z are perpendicular to one another. However, they may intersect one another at an angle other than 90 degrees. The first direction X and the second direction Y are equivalent to directions parallel to the surfaces of the basements constituting the display device DSP. The third direction Z is equivalent to the thickness direction of the display device DSP. As an example of the display device DSP, a liquid crystal display device comprising a sensor SS is explained.

As shown in FIG. 1, the display device DSP comprises a display panel PNL, an IC chip 1, a circuit board (wiring substrate) 3, a backlight unit BL as described later, etc. The display panel PNL is a liquid crystal display panel, and comprises a first substrate SUB1, a second substrate SUB2, a sealing member SE and a liquid crystal layer LC as a display function layer. The second substrate SUB2 faces the first substrate SUB1 in the third direction Z. The sealing member SE is equivalent to the portion indicated with hatch lines from bottom left to top right in FIG. 1. The first substrate SUB1 is bonded to the second substrate SUB2 with the sealing member SE. The liquid crystal layer LC is located in the space between the first substrate SUB1 and the second substrate SUB2 inside the sealing member SE.

In the following explanation, the direction from the first substrate SUB1 to the second substrate SUB2 is referred to as "upward". The direction from the second substrate SUB2 to the first substrate SUB1 is referred to as "downward". A plan view is defined as appearance from the second substrate SUB2 to the first substrate SUB1.

The display panel PNL comprises a display area DA which displays an image, and a non-display area NDA outside the display area DA. The display area DA is located inside the area surrounded by the sealing member SE. The non-display area NDA has a frame shape surrounding the display area DA, and is adjacent to the display area DA. The sealing member SE is located in the non-display area NDA.

The IC chip 1 functions as the controller of the display panel PNL, the sensor SS, etc. The IC chip 1 is mounted on the circuit board 3. However, the structure is not limited to the example shown in FIG. 1. The IC chip 1 may be mounted on either the first substrate SUB1 extending to the outside in comparison with the second substrate SUB2 or an external circuit board connected to the circuit board 3. For example, the IC chip 1 comprises a built-in display driver DD which outputs signals necessary for image display. The display driver DD may include, for example, at least part of a signal line drive circuit SD, a scanning line drive circuit GD and a common electrode drive circuit CD as described later. In the example shown in FIG. 1, the IC chip 1 comprises a built-in detection circuit RC which functions as a touch panel controller, etc. The detection circuit RC may be incorporated into another IC chip different from the IC chip 1.

For example, the display panel PNL may be either a transmissive display panel comprising a transmissive display function for displaying an image by selectively transmitting light from the lower side of the first substrate SUB1, or a reflective display panel comprising a reflective display function for displaying an image by selectively reflecting light from the upper side of the second substrate SUB2. Alternatively, the display panel PNL may be a transreflective display panel comprising a transmissive display function and a reflective display function.

The sensor SS performs sensing for detecting a contact or approach of an object with/to the display device DSP. The sensor SS is a mutual-capacitive sensor, and is capable of detecting a contact or approach of an object based on the change of electrostatic capacitance between a pair of electrodes facing each other across an intervening dielectric. The sensor SS comprises a plurality of sensor drive electrodes Tx and a plurality of detection electrodes Rx (Rx1, Rx2, Rx3, Rx4, . . . ).

Each detection electrode Rx comprises body portions RS crossing the display area, and connection portions CN connecting the body portions. Each detection electrode Rx comprises a terminal RT (RT1, RT2, RT3, RT4, . . . ) connected to the connection portion CN.

The body portions RS have a strip shape formed by a group of fine metal wires formed in a mesh shape. A dummy area in which metal wires are arranged in substantially the same manner as the body portions RS is present between adjacent body portions RS. The metal wires of the dummy areas are not connected to any line, and are electrically in a floating state.

At least a part of each terminal RT overlaps the sealing member SE as seen in plan view. The terminals RT are located on an end side or the other end side of the non-display area NDA.

The first substrate SUB1 comprises pads P (P1, P2, P3, P4, . . . ) and lines W (W1, W2, W3, W4, . . . ). Each pad P and each line W are located on an end side or the other end side of the non-display area NDA, and overlap the sealing member SE as seen in plan view. The pads P overlap the terminals RT as seen in plan view. The lines W are connected to the pads P, extend in the second direction Y and the first direction X, and are electrically connected to the detection circuit RC of the IC chip 1 via the circuit board 3.

Contact holes V (V1, V2, V3, V4, . . . ) are formed at positions at which the terminals RT face the pads P. The contact holes are explained later.

The sensor drive electrodes Tx are provided in the first substrate SUB1. The detection electrodes Rx are provided in the second substrate SUB2. The sensor drive electrodes Tx intersect the detection electrodes Rx in the X-Y plane. For example, each sensor drive electrode Tx has a strip shape extending in the second direction Y. The sensor drive electrodes Tx are arranged at intervals in the first direction X.

The sensor drive electrodes Tx are electrically connected to the common electrode drive circuit CD via lines WR. In the present embodiment, the sensor drive electrodes Tx are formed by common electrodes CE as described later. The sensor drive electrodes Tx have a function for generating an electric field between the sensor drive electrodes Tx and pixel electrodes PE, and a function for detecting the position of an object by generating capacitance between the sensor drive electrodes Tx and the detection electrodes Rx.

The common electrode drive circuit CD supplies a common signal to the sensor drive electrodes Tx including the common electrodes CE in a display period for displaying an image in the display area DA. In the display period, the signal line drive circuit SD supplies an image signal to the pixel electrodes PE described later. The common electrode drive circuit CD supplies a sensor drive signal to the sensor drive electrodes Tx in a sensing period (touch period) for performing sensing. When a sensor drive signal is supplied to the sensor drive electrodes Tx, the detection electrodes Rx output a sensor signal necessary for sensing, in other words, a signal based on the change of capacitance between the sensor drive electrodes Tx and the detection electrodes Rx. The detection circuit RC shown in FIG. 1 reads the sensor signal output from the detection electrodes Rx.

The sensor SS is not limited to a mutual-capacitive sensor which detects an object based on the change of electrostatic capacitance between the sensor drive electrodes Tx and the detection electrodes Rx. The sensor SS may be a self-capacitive sensor which detects an object based on the change of the capacitance of the detection electrodes Rx.

FIG. 2 is a cross-sectional view obtained by cutting the display device DSP in the first direction X in the display area DA. In the example shown in FIG. 2, the display panel PNL comprises a structure corresponding to a display mode mainly using a lateral electric field substantially parallel to the X-Y plane. The display panel PNL may comprise a structure corresponding to a display mode using a longitudinal electric field perpendicular to the X-Y plane, an electric field inclined with respect to the X-Y plane or a combination thereof.

As shown in FIG. 2, the first substrate SUB1 comprises a first basement 10. On the upper surface (third surface) of the first basement 10, a first insulating layer 11, signal lines S, a second insulating layer 12, the common electrode CE, a metal layer M, a third insulating layer 13, the pixel electrodes PE, a first alignment film AL1, etc., are stacked in this order. For example, the metal layer M is formed by stacking molybdenum, aluminum and molybdenum in order. In FIG. 2, for example, the illustration of switching elements, scanning lines and various insulating layers interposed between the switching elements and the scanning lines is omitted.

The second substrate SUB2 comprises a second basement 20. On the lower surface (first surface) of the second basement 20, a light-shielding layer BM, a color filter CF, an overcoat layer OC and a second alignment film AL2, etc., are stacked in this order.

A first polarizer PL1 is located between the first basement 10 and the backlight BL. A second polarizer PL2 is located above the detection electrode Rx provided in the second basement 20.

Figure 3:
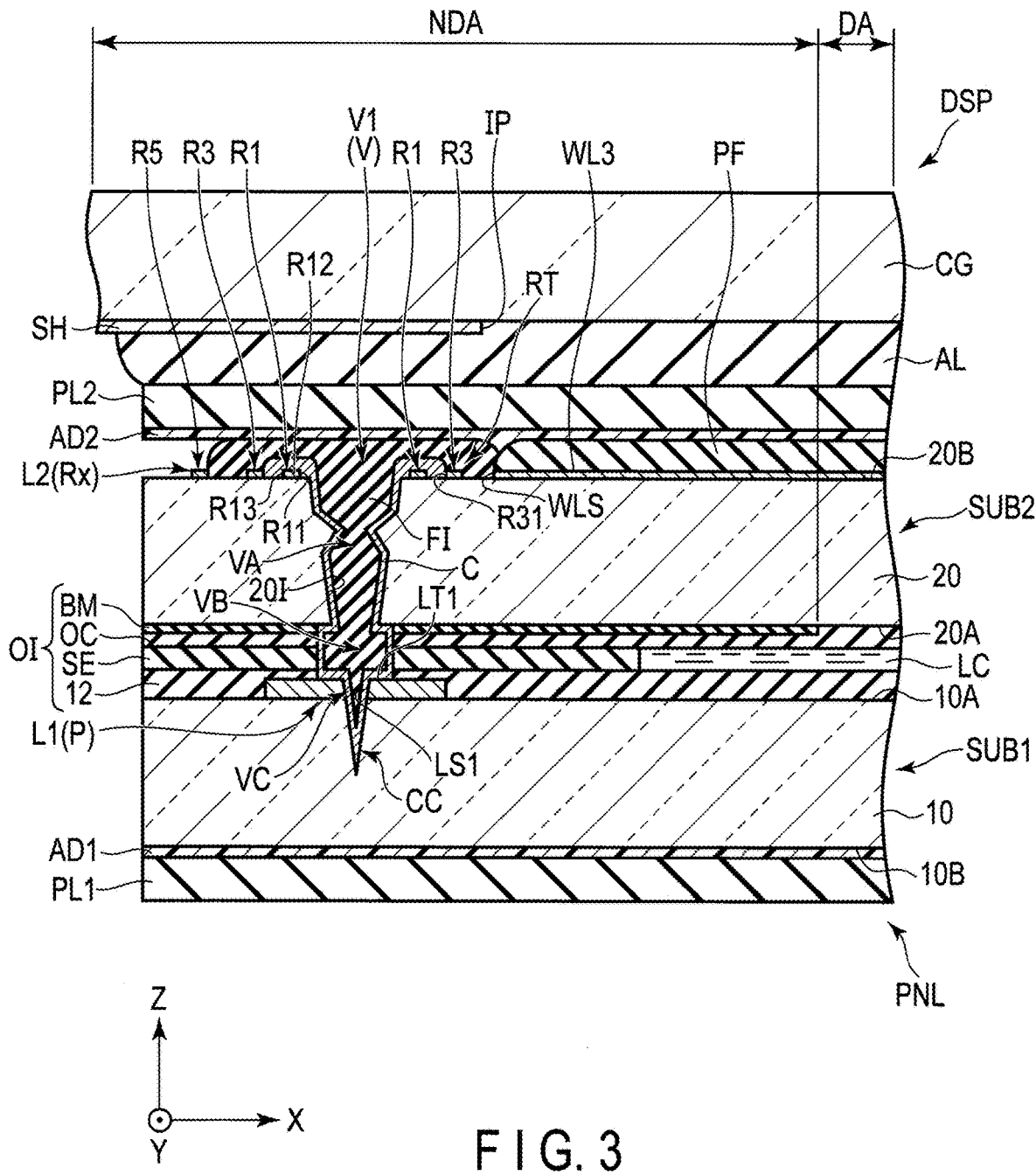
FIG. 3 is a cross-sectional view of the display device along the line of FIG. 1.

Now, the contact holes V (V1, V2, V3, V4, . . . ) are explained. FIG. 3 is a schematic cross-sectional view of the display device DSP along the line of FIG. 1.

As shown in FIG. 3, the display device DSP comprises the first substrate SUB1, the second substrate SUB2, an organic insulating layer OI, a connecting material C, the first polarizer PL1, the second polarizer PL2 and a cover member CG. The first polarizer PL1 is adhered to the first substrate SUB1 with an adhesive layer AD1. The second polarizer PL2 is adhered to the second substrate SUB2 with an adhesive layer AD2.

The first substrate SUB1 comprises the first basement 10 and a first conductive layer L1. The first conductive layer L1 includes the pad P (P1, P2, P3, P4, ...) and the line W (W1, W2, W3, W4, ...), and is located on the third surface 10A side facing the second substrate SUB2. The first insulating layer 11 shown in FIG. 2, other insulating layers or other conductive layers may be provided between the first basement 10 and the pad P or between the first basement 10 and the second insulating layer 12.

The second substrate SUB2 comprises the second basement 20 and a second conductive layer L2. The first surface 20A of the second basement 20 faces the first conductive layer L1, and is provided away from the first conductive layer L1 in the third direction Z. The second conductive layer L2 includes the detection electrode Rx, in other words, the terminal RT (RT1, RT2, RT3, RT4, ...), the connection portion CN and the body portion RS. The second conductive layer L2 is located on the second surface 20B side, and is covered with a protection material PF. In other words, the first basement 10, the first conductive layer L1, the second basement 20, the second conductive layer L2 and the protection material PF are arranged in this order in the third direction Z.

The organic insulating layer OI is located between the first conductive layer L1 and the second basement 20. In place of the organic insulating layer OI, an inorganic insulating layer or another conductive layer may be located, or an air layer may be located. Various insulating layers or conductive layers may be provided between the second basement 20 and the second conductive layer L2 or on the second conductive layer L2.

For example, the organic insulating layer OI includes the sealing member SE for bonding the first substrate SUB1 and the second substrate SUB2, the second insulating layer 12 of the first substrate SUB1, the light-shielding layer BM and the overcoat layer OC of the second substrate SUB2, etc. The sealing member SE is located between the second insulating layer 12 and the overcoat layer OC. The liquid crystal layer LC is provided in the gap between the first substrate SUB1 and the second substrate SUB2, and is surrounded by the sealing member SE.

The metal layer M, the third insulating layer 13 and the first alignment film AU shown in FIG. 2 may be interposed between the second insulating layer 12 and the sealing member SE. The second alignment film AL2 shown in FIG. 2 may be interposed between the overcoat layer OC and the sealing member SE.

The first and second basements 10 and 20 are formed of, for example, alkali-free glass or transparent resin having insulation properties. The protection material PF is formed of, for example, an organic insulating material such as acrylic resin. The first and second conductive layers L1 and L2 are formed of, for example, a metal material such as molybdenum, tungsten, titanium, aluminum, silver, copper or chromium, an alloy containing these metal materials, or a transparent conductive material such as indium tin oxide (ITO) or indium zinc oxide (IZO). The first and second conductive layers L1 and L2 may have either a single-layer structure or a multi-layer structure. In the present embodiment, the first conductive layer L1 is formed by stacking titanium, aluminum and titanium in order. The second conductive layer L2 is formed by stacking molybdenum, aluminum, molybdenum and a transparent conductive material in order.

A first hole VA penetrating the second basement 20 in the non-display area NDA is formed in the second substrate SUB2. The first hole VA penetrates a region between the first surface 20A and the second surface 20B. In the example shown in FIG. 3, the second conductive layer L2 is not present at a position overlapping the first hole VA.

The display device DSP comprises the first hole VA, and further comprises a second hole VB penetrating the organic insulating layer OI, a third hole VC penetrating the first conductive layer L1, and a concavity CC formed in the first basement 10. The first hole VA, the second hole VB, the third hole VC and the concavity CC communicate with each other, and form the contact hole V.

The second hole VB includes a hole penetrating the second insulating layer 12, a hole penetrating the sealing member SE, a hole penetrating the light-shielding layer BM and the overcoat layer OC, etc. The first conductive layer L1 comprises an upper surface LT1 which is not covered with the organic insulating layer OI in the second hole VB, and an inner surface LS1 in the third hole VC. The second hole VB, the third hole VC and the concavity CC are located immediately under the first hole VA. The contact hole V may be formed by applying laser light from the upper side of the second substrate SUB2.

The connecting material C is provided in the contact hole V. The substrate conductive structure of the present embodiment includes the connecting material C and the layers in which the contact hole V is formed, in other words, the first substrate SUB1, the second substrate SUB2 and the organic insulating layer OI. The connecting material C contains a metal material such as silver. The connecting material C should preferably contain a material obtained by mixing the fine particles of a metal material having a particle size of several nanometers to several tens of nanometers with a solvent.

The connecting material C electrically connects the first and second conductive layers L1 and L2 provided in the different substrates via the contact hole V. The connecting material C is located inside and outside the contact hole V. The connecting material C covers the inner circumferential surface 20I of the second basement 20 in the first hole VA, the inner circumferential surface of the organic insulating layer OI in the second hole VB, the inner surface LS1, etc. The connecting material C is located above the second surface 20B.

In the example shown in FIG. 3, with regard to the relationship between the connecting material C and the first conductive layer L1, the connecting material C is in contact with the upper surface LT1 and the inner surface LS1 of the pad P. With regard to the relationship between the connecting material C and the second conductive layer L2, the connecting material C is in contact with the inner circumferential surface R11, the upper surface R12 and the outer circumferential surface R13 of a first convex part R1, and the inner circumferential surface R31 of a third convex part R3 as described later.

In the example shown in FIG. 3, the connecting material C is in contact with the inner circumferential surface 20I, the inner circumferential surface of the second hole VB, and the inner surface LS1. However, the central vicinity of these surfaces is not filled with the connecting material C. More specifically, the connecting material C merely covers these inner circumferential surfaces. The connecting material C is thin. To fill the hollow portion of the contact hole V, the contact hole V is filled with a filling material H. The filling material FI is formed of, for example, the same material as the protection material PF. It is possible to employ a structure for filling the contact hole V with the connecting material C.

The connecting material C is continuously formed between the first conductive layer L1 and the second conductive layer L2. In this way, the second conductive layer L2 is electrically connected to the circuit board 3 via the connecting material C and the first conductive layer L1. Thus, the control circuit which writes a signal to the second conductive layer L2 and reads a signal output from the second conductive layer L2 is allowed to be connected to the second conductive layer L2 via the circuit board 3. There is no need to separately provide a circuit board for the second substrate SUB2 to connect the second conductive layer L2 and the control circuit.

The cover member CG is flat, is formed over the display area DA and the non-display area NDA, and covers the entire display panel PNL. On the surface of the cover member CG on the side facing the display panel PNL, a light-shielding layer SH is formed. The light-shielding layer SH is provided in the non-display area NDA. The light-shielding layer SH covers the contact hole V, the connecting material C, etc.

The cover member CG is adhered to the second polarizer PL2 with an adhesive layer AL. For example, the adhesive layer AL is formed of optically clear resin (OCR). The thickness of the entire adhesive layer AL is substantially uniform.

Figure 4:
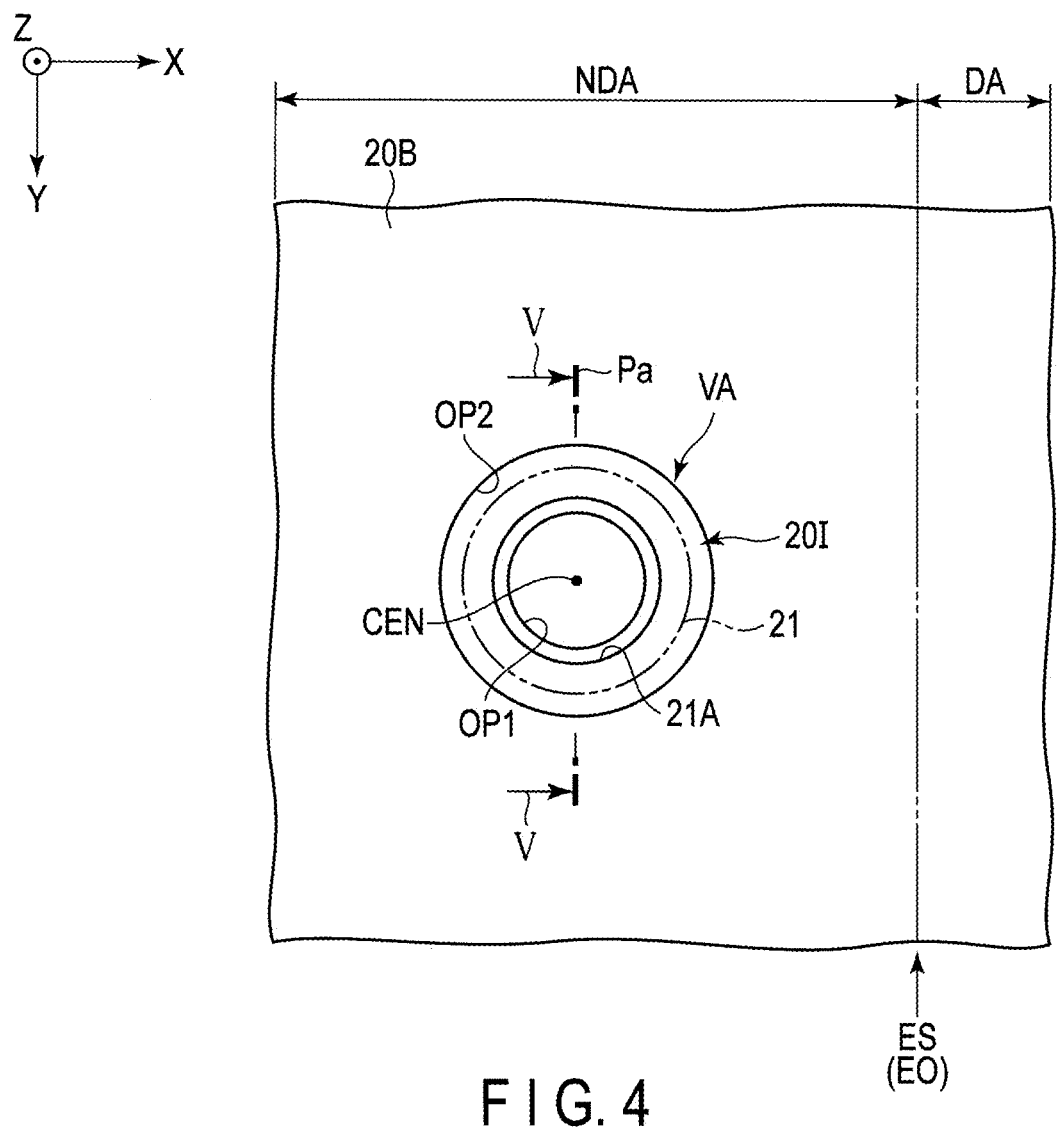
FIG. 4 is a plan view showing the first hole and the second surface shown in FIG. 3.

As shown in FIG. 4, the first hole VA faces an edge ES of the outer edge EO of the display area DA. The first hole VA comprises a first opening end OP1, a second opening end OP2 and a top end 21A. The first opening end OP1 is located on the first surface 20A side. The second opening end OP2 is located on the second surface 20B side. In the example shown in FIG. 4, the first hole VA comprises a central axis CEN. The first opening end OP1 and the second opening end OP2 are perfect circles and concentric circles as seen in plan view. In the present embodiment, the diameter of the second opening end OP2 is 100 to 150 μm.

A first projection 21 comprises the top end 21A. The first projection 21 forms a part of the inner circumferential surface 20I of the second basement 20 in the first hole VA, and projects to the central axis CEN. In the present embodiment, the first projection 21 has a ring shape, and is continuously formed around the central axis CEN. However, in a manner different from that of the present embodiment, the first projection 21 may be discontinuously formed around the central axis CEN. In the present embodiment, as seen in plan view, the top end 21A is located between the first opening end OP1 and the second opening end OP2. However, in a manner different from that of the present embodiment, the top end 21A may be closer to the central axis CEN than the first opening end OP1.

FIG. 5 is a cross-sectional view showing the display panel along the line V-V of FIG. 4. FIG. 5 shows a section on a virtual first perpendicular surface Pa. The virtual first perpendicular surface Pa penetrates the central axis CEN of the first hole VA and is perpendicular to the first surface 20A. In the present embodiment, the first perpendicular surface Pa is parallel to the edge ES. In other words, the first perpendicular surface Pa is parallel to the Y-Z plane defined by the second direction Y and the third direction Z (parallel to the normal of the first surface 20A).

As shown in FIG. 5, the first projection 21 comprises the top end 21A closest to the central axis CEN. The first projection 21 forms a constriction in the first hole VA. In the present embodiment, the second basement 20 and the first projection 21 are integrally formed of the same material. The connecting material C passes through the first hole VA, etc., and covers the surface of the first hole VA including the first projection 21.

On the first perpendicular surface Pa, width WI of the first hole VA is gradually decreased from the second surface 20B to the first surface 20A. For example, on the first perpendicular surface Pa, width WI1 of the first hole VA on a side closer to the first surface 20A than the first projection 21 is less than width WI2 of the first hole VA on a side closer to the second surface 20B than the first projection 21.

The second basement 20 has thickness T1 in a direction parallel to the central axis CEN. In the thickness direction of the second basement 20, the top end 21A is located on the second surface 20B side in comparison with one-half of the second basement 20. For example, in the thickness direction, the top end 21A is located at a position of approximately a quarter of the second basement 20 from the second surface 20B.

In the present embodiment, thickness T1 of the second basement 20 is 100 to 150 μm. Distance DI2 between the second surface 20B and the top end 21A along the central axis CEN is 10 to 30 μm. Distance DI3 between the second opening end OP2 and the top end 21A in the second direction Y is 5 to 20 μm. For example, when thickness T1 is 125 μm, distance DI2 is 30 μm.

In the second direction Y, the width of the second hole VB is greater than the width (diameter) of the first opening end OP1, and is greater than the width of the third hole VC. As seen in plan view, the second hole VB is larger than the first opening end OP1, and is larger than the third hole VC. On the upper surface LT1 of the first conductive layer L1, an area which is in contact with the connecting material C has a ring shape as seen in plan view.

Figure 6:
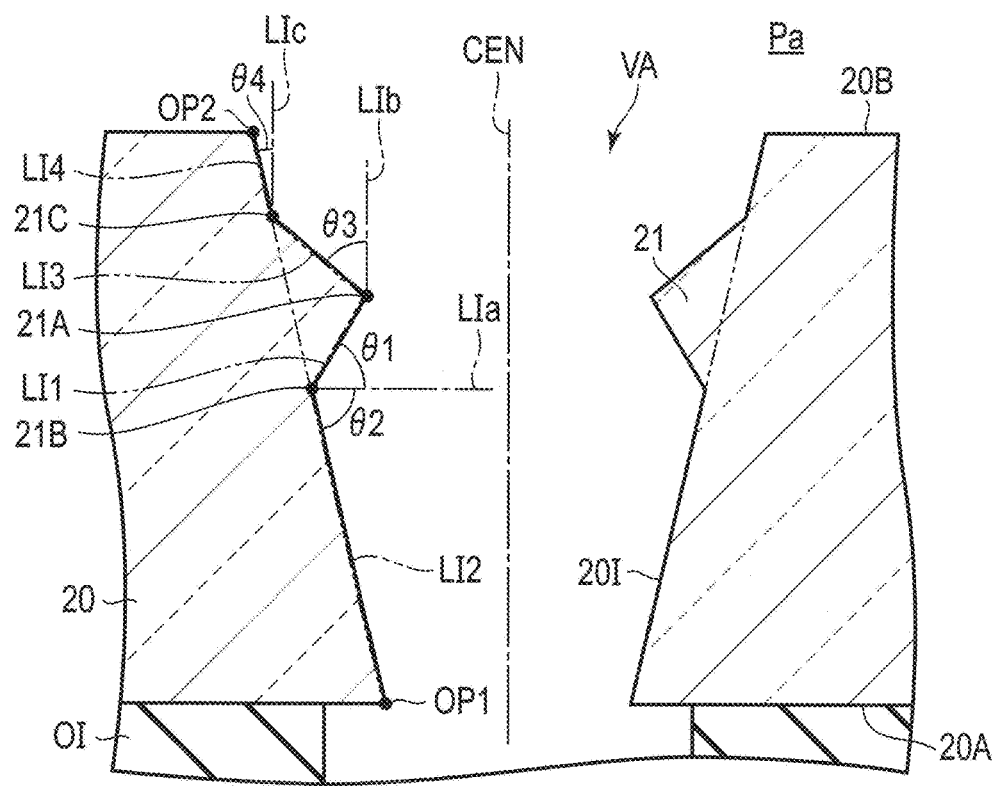
FIG. 6 is an enlarged cross-sectional view showing a part of the display panel shown in FIG. 5.

As shown in FIG. 6, the first projection 21 comprises the top end 21A, and further comprises a first end 21B on the first surface 20A side, and a second end 21C on the second surface 20B side. On the first perpendicular surface Pa, a first angle θ1 is less than a second angle θ2, and a third angle θ3 is greater than a fourth angle θ4.

The first angle θ1 is an angle between a first reference line LIa and a first straight line LI1. The first reference line LIa is a straight line passing through the first end 21B and parallel to the first surface 20A. The first straight line LI1 is a line connecting the first end 21B and the top end 21A.

The second angle θ2 is an angle between the first reference line LIa and a second straight line LI2. The second straight line LI2 is a line connecting the first end 21B and the first opening end OP1.

The third angle θ3 is an angle between a second reference line LIb and a third straight line LI3. The second reference line LIb is a line passing through the top end 21A and parallel to the central axis CEN. The third straight line LI3 is a line connecting the top end 21A and the second end 21C.

The fourth angle θ4 is an angle between a third reference line LIc and a fourth straight line LI4. The third reference line LIc is a line passing through the second end 21C and parallel to the central axis CEN. The fourth straight line LI4 is a line connecting the second end 21C and the second opening end OP2.

Each of the first to fourth angles θ1 to θ4 is less than 90 degrees.

In the example shown in FIG. 6, on the inner circumferential surface 20I of the second basement 20, a part corresponding to the second straight line LI2, a part corresponding to the third straight line LI3 and a part corresponding to the fourth straight line LI4 have a forward tapered shape, and a part corresponding to the first straight line LH has an inverse tapered shape.

Figure 7:
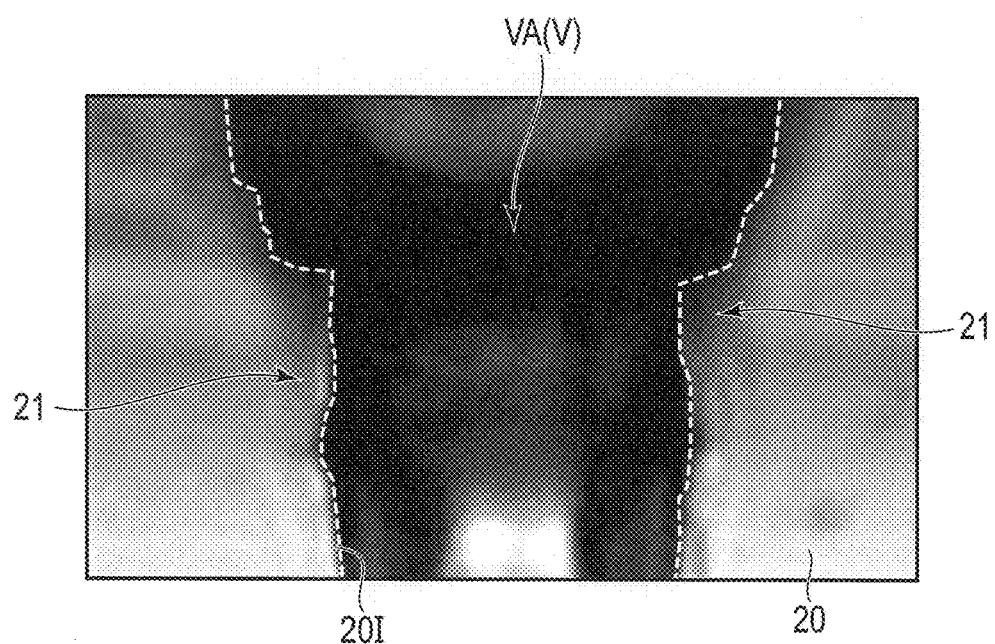
FIG. 7 is a figure in which a part of the display panel is captured by an electron microscope, and is a cross-sectional view showing a part of a second basement in which the first hole is formed.

The inventors of the present application, etc, manufactured the display panel PNL of the present embodiment and examined the first projection 21. FIG. 7 is a figure in which a part of the display panel PNL is captured by an electron microscope, and is a cross-sectional view showing a part of the second basement 20 in which the first hole VA is formed. In FIG. 7, dashed lines are added to the inner circumferential surface 20I of the second basement 20.

After the first projection 21 was examined based on FIG. 7, the following result was obtained. The first projection 21 was formed on the inner circumferential surface 20I of the second basement 20, and a constriction was formed in the first hole VA.

Now, this specification explains a method for manufacturing the display device DSP of the present embodiment. Here, a method for forming the contact hole V is explained.

Figure 8:
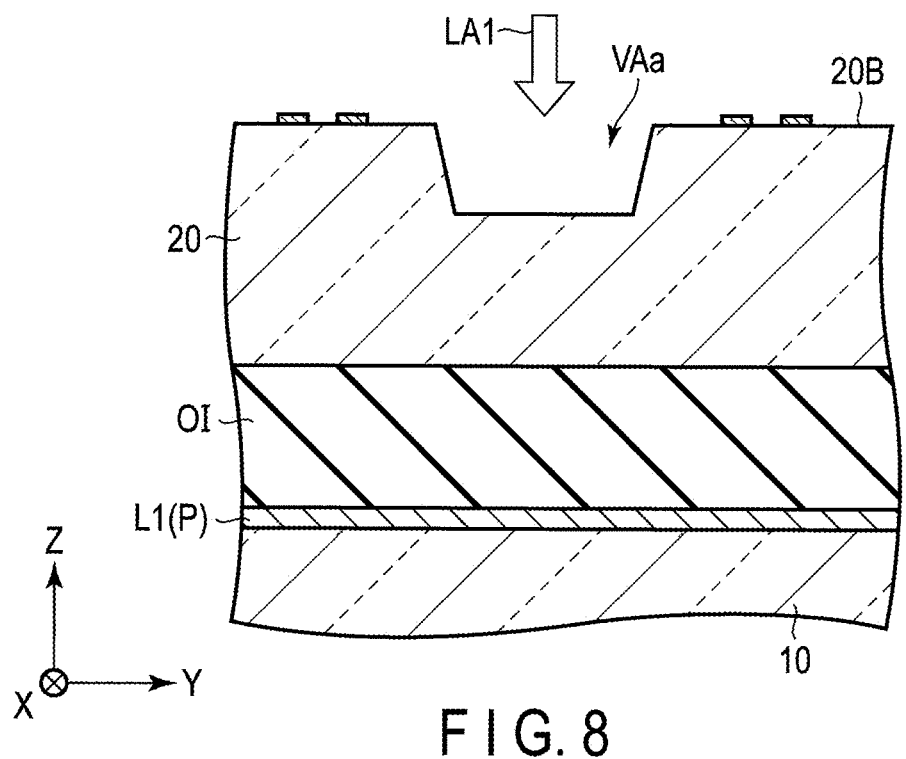
FIG. 8 is shown for explaining a method for manufacturing the display device of the first embodiment, and shows a state in which a concavity is formed in the second basement by the first application of laser light to the second basement of the display panel while the display panel is manufactured.

As shown in FIG. 8, when the contact hole V is formed, the second basement 20 is irradiated with laser light LA1 from the upper side of the second surface 20B. The energy intensity of laser light LA1 is set so as to be less. Thus, a shallow concavity VAa can be formed in the second basement 20 by the first application of laser light.

Figure 9:
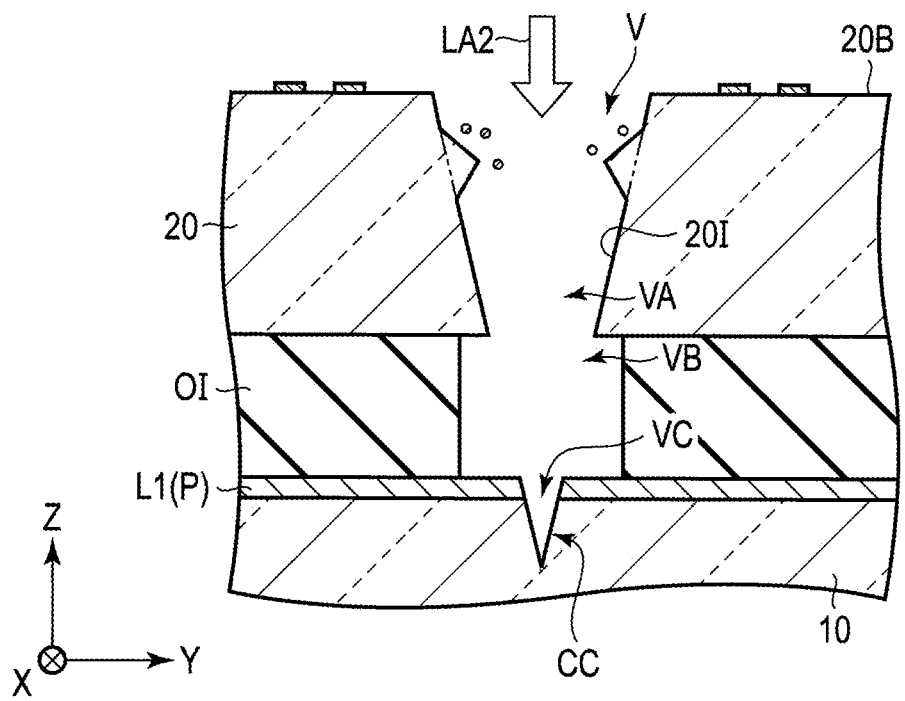
FIG. 9 is shown for explaining the method for manufacturing the display device of the first embodiment after FIG. 8, and shows a state in which a contact hole is formed by the second application of laser light to the display panel while the display panel is manufactured.

Subsequently, as shown in FIG. 9, the second basement 20 is irradiated with laser light LA2 from the upper side of the concavity VAa. The energy intensity of laser light LA2 is set so as to be greater than that of laser light LA1. In this way, the contact hole V penetrating the second basement 20, the organic insulating layer OI and the first conductive layer L1 and comprising a concave bottom portion in the first basement 10 can be formed.

When laser light LA2 is applied, a residue of the second basement 20 flies at a high temperature and is welded to and deposited on the inner circumferential surface 20I of the first hole VA. Thus, the first projection 21 is formed.

When thermal energy is applied to the display panel PNL by the irradiation with laser light LA2, the organic insulating material used for the organic insulating layer OI is more easily sublimed than the metal used for the first conductive layer L1 and the glass used for the second basement 20. Thus, as described above, the second hole VB is extended.

For the laser, for example, a carbon dioxide laser is applicable. However, any laser may be used as long as a hole can be formed in the second basement 20 and the organic insulating layer OI. An excimer laser is also applicable.

According to the display device DSP of the first embodiment having the above structure, the detection electrodes Rx provided in the second substrate SUB2 are connected to the pads P provided in the first substrate SUB1 by the connecting materials C provided in the contact holes V. In this way, there is no need to mount a circuit board for connecting the detection electrodes Rx and the detection circuit RC on the second substrate SUB2.

The first projection 21 forms a part of the inner circumferential surface 20I of the second basement 20 in the first hole VA, projects to the central axis CEN and forms a constriction in the first hole VA. A relatively gentle slope is formed in the inner circumferential surface 20I by the first projection 21. In this way, when the film surface of the connecting material C is formed in the inner circumferential surface 20I, it is possible to prevent the connecting material C from flowing in the direction of gravitational force (in other words, a direction opposite to the third direction Z shown in FIG. 5, etc.). When the first projection 21 forms a part of the inner circumferential surface 20I, it is possible to attach the connecting material C to the inner circumferential surface 20I in an excellent manner near the second opening end OP2 in comparison with a case where the inner circumferential surface 20I is formed without the first projection 21. In this manner, the first conductive layer L1 can be electrically continuous with the second conductive layer L2 with the connecting material C.

Based on the above structures, it is possible to obtain the display device DSP comprising a high-reliability substrate connector.

Second Embodiment

A second embodiment is explained. The display device DSP of the second embodiment is different from that of the first embodiment in the following respect. A first projection 21 is a rack portion, and a second substrate SUB2 further comprises a second projection 22.

As shown in FIG. 10, a first projection 21 comprises an upper surface 21D facing the opening on the second surface 20B side of a first hole VA. In the example shown in FIG. 10, the upper surface 21D has a ring shape, and is continuously formed around a central axis CEN. The second projection 22 overlaps the upper surface 21D. In the example shown in FIG. 10, the second projection 22 has a ring shape, and is continuously formed over the whole circumference of the upper surface 21D.

In FIG. 10, the upper surface 21D is equivalent to the part indicated with diagonal lines from top left to bottom right, and the second projection 22 is equivalent to the part indicated with diagonal lines from bottom left to top right.

As shown in FIG. 11, the first projection 21 forms a difference on an inner circumferential surface 20I. The upper surface 21D is parallel to, for example, a first surface 20A. The second projection 22 is provided on the upper surface 21D of the first projection 21, and projects to the second surface 20B side. The second projection 22 is fixed to the upper surface 21D. A second basement 20, the first projection 21 and the second projection 22 are integrally formed of the same material. A connecting material C covers the upper surface 21D, the second projection 22, etc.

Distance DI1 between the second surface 20B and the upper surface 21D along the central axis CEN is less than one-half of thickness T1.

It is possible to employ a structure in which the upper surface 21D is not parallel to the first surface, specifically, a structure in which the upper surface 21D has a downward slope from the inner circumferential surface to the central axis. In this case, when the angle of the slope is assumed with angle θ3 of FIG. 6, angle θ3 is greater than the inclination angle (angle θ4 of FIG. 6) of the inner circumferential surface.

Now, this specification explains a method for manufacturing the display device DSP of the present embodiment. Here, a method for forming a contact hole V is explained. In the present embodiment, a carbon dioxide laser is used for the laser.

As shown in FIG. 12, when the contact hole V is formed, the second basement 20 is irradiated with top-hat laser light LA1 from the upper side of the second surface 20B. The energy intensity of laser light LA1 is set so as to be less. Thus, a shallow concavity VAa can be formed in the second basement 20 by the first application of laser light. In this way, the upper surface 21D is formed on the second basement 20.

Subsequently, as shown in FIG. 13, the second basement 20 is irradiated with Gaussian laser light LA2 from the upper side of the concavity VAa. The energy intensity of laser light LA2 is set so as to be greater than that of laser light LA1. As seen in plan view, the irradiation range of laser light LA2 is narrower than that of laser light LA1. The contact hole V can be formed by the second application of laser light LA2.

Thus, the first projection 21 structuring a part of the inner circumferential surface 20I can be formed. In other words, a step can be formed on the inner circumferential surface 20I.

When laser light LA2 is applied, a residue of the second basement 20 flies at a high temperature and is welded to and deposited on the upper surface 21D of the first projection 21. Thus, the second projection 22 can be formed.

According to the display device DSP of the second embodiment having the above structure, the first projection 21 forms a part of the inner circumferential surface 20I. When the film surface of the connecting material C is formed in the inner circumferential surface 20I, the upper surface 21D of the first projection 21 and the second projection 22 can prevent the metal materials contained in the connecting material C from flowing in the direction of gravitational force. In the second embodiment, effects similar to those of the first embodiment can be obtained.

Third Embodiment

A third embodiment is explained. The display device DSP of the third embodiment is different from that of the second embodiment in respect that a second projection 22 overlaps the inner periphery of the upper surface 21D of a first projection 21.

Figure 14:
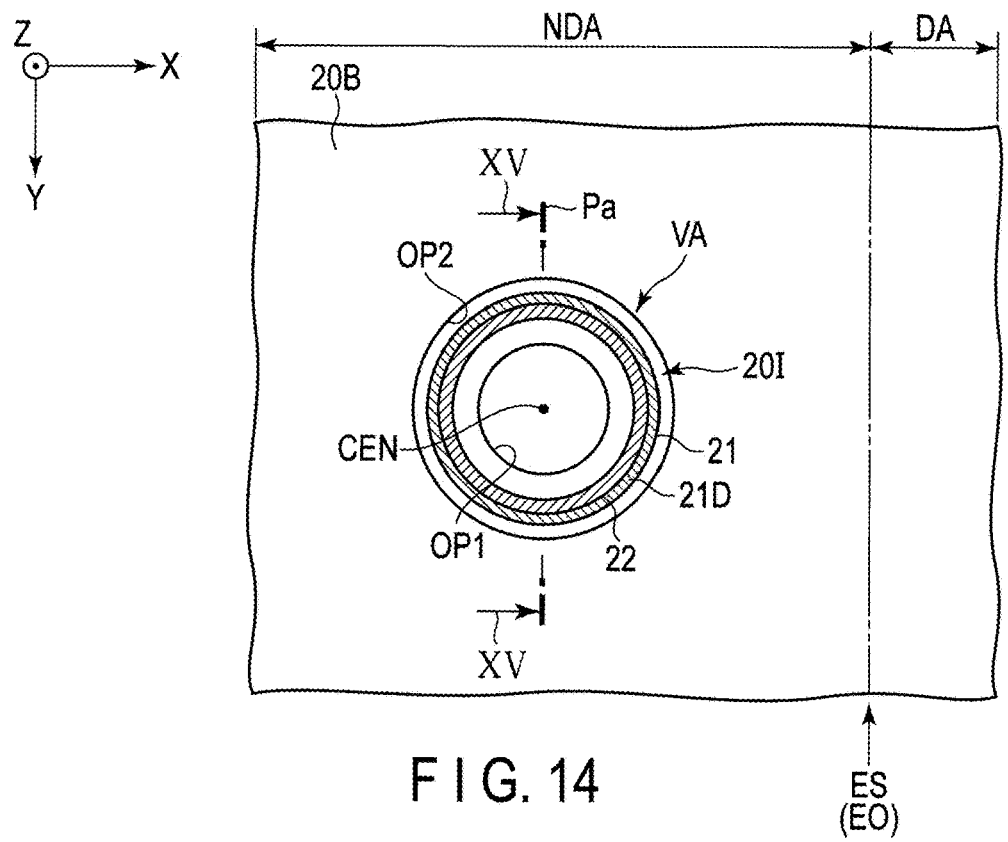
FIG. 14 is a plan view showing a first hole and a second surface in a display device according to a third embodiment.

As shown in FIG. 14, as seen in plan view, the upper surface 21D is exposed on the outer side of the second projection 22, and is not exposed on the inner side of the second projection 22.

Figure 15:
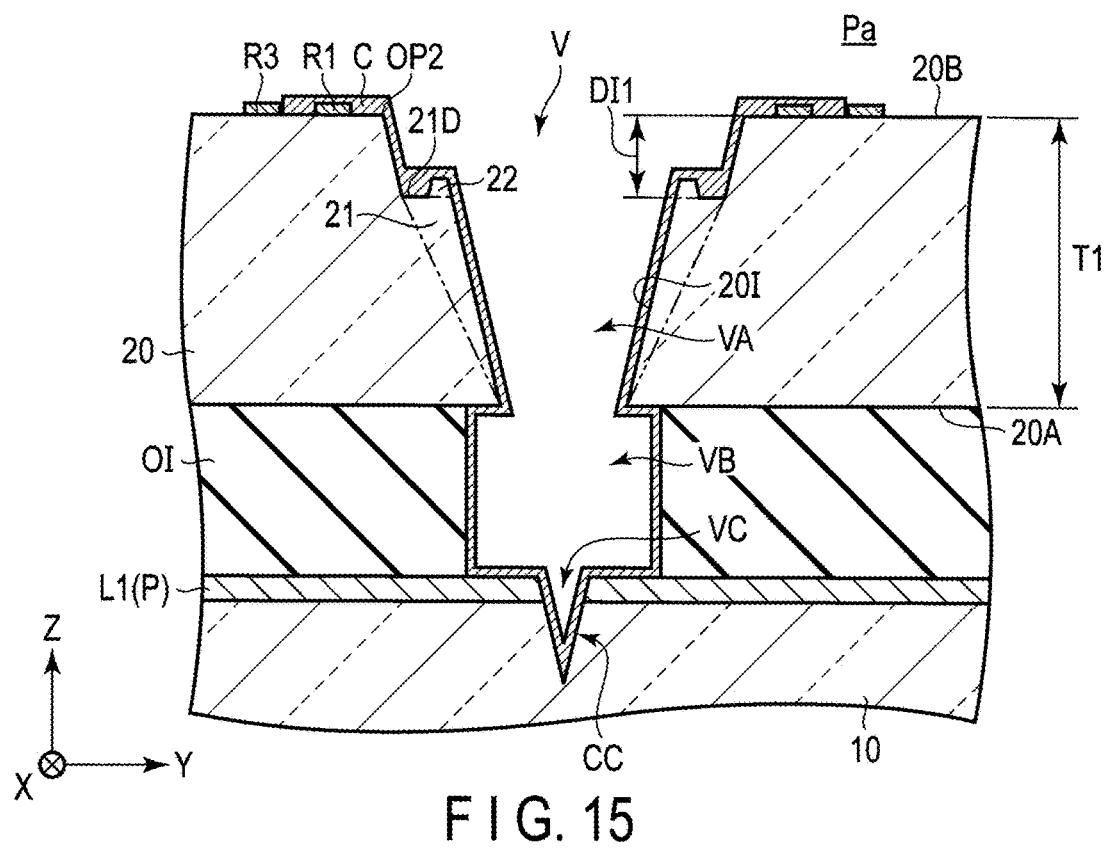
FIG. 15 is a cross-sectional view showing a display panel along the line XV-XV of FIG. 14.

As shown in FIG. 15, the first projection 21 forms a step on an inner circumferential surface 20I. In the present embodiment, similarly, distance DI1 is less than one-half thickness T1.

Now, this specification explains a method for manufacturing the display device DSP of the present embodiment. Here, a method for forming a contact hole V is explained.

When the contact hole V is formed, a second basement 20 is irradiated with top-hat laser light from the upper side of a second surface 20B. The energy intensity of top-hat laser light is set so as to be less. The irradiation area of top-hat laser light has a ring shape. Thus, a shallow concavity having a ring-shape can be formed in the second basement 20 by the first application of laser light. In this way, the upper surface 21D is formed on the second basement 20.

Subsequently, the second basement 20 is irradiated with Gaussian laser light from the upper side of the second surface 20B. The energy intensity of Gaussian laser light is set so as to be greater than that of top-hat laser light LA1. The irradiation area of Gaussian laser light is inside the above concavity having a ring-shape. The contact hole V can be formed by the second application of laser light.

Thus, the first projection 21 structuring a part of the inner circumferential surface 20I can be formed. In other words, a step can be formed on the inner circumferential surface 20I.

The portion in which the second basement 20 remains without sublimation even when top-hat laser light and Gaussian laser light are applied forms the second projection 22. When Gaussian laser light is applied, a residue of the second basement 20 may also form the second projection 22.

In the third embodiment having the above structure, effects similar to those of the second embodiment can be obtained.

Modification Example of Third Embodiment

A modification example of the third embodiment is explained. The display device DSP of the present modification example is different from that of the third embodiment in respect that the upper surface 21D and the second projection 22 are discontinuously formed around a central axis CEN.

As seen in the plan view of FIG. 16, a first hole VA comprises a single hole VAb, and a plurality of holes VAa connected to the hole VAb. The holes VAa are located outside the hole VAb and are discontinuously provided around the central axis CEN. The upper surface 21D is located inside each hole VAa. The upper surface 21D is equivalent to the bottom of each hole VAa. The second projection 22 is located in an area in which the holes VAa are connected to the hole VAb.

In the present modification example, a first perpendicular surface Pa penetrates the upper surface 21D, the second projection 22, etc. The cross-sectional structure of the display panel PNL of the present modification example on the first perpendicular surface Pa is the same as that of the third embodiment shown in FIG. 15.

FIG. 17 shows a section on a virtual second perpendicular surface Pb. The virtual second perpendicular surface Pb penetrates the central axis CEN of the first hole VA and is perpendicular to the first surface 20A. As shown in FIG. 17, in the modification example, neither the first projection 21 (upper surface 21D) nor the second projection 22 is located on the second perpendicular surface Pb. The first projection 21 (upper surface 21D) and the second projection 22 are located on the first perpendicular surface Pa.

In the modification example of the third embodiment having the above structure, effects similar to those of the third embodiment can be obtained.

Fourth Embodiment

A fourth embodiment is explained. The display device DSP of the fourth embodiment is different from that of the second embodiment in the following respect. Two or more steps are formed on an inner circumferential surface 20I, and a second substrate SUB2 does not comprise a second projection 22.

Figure 18:
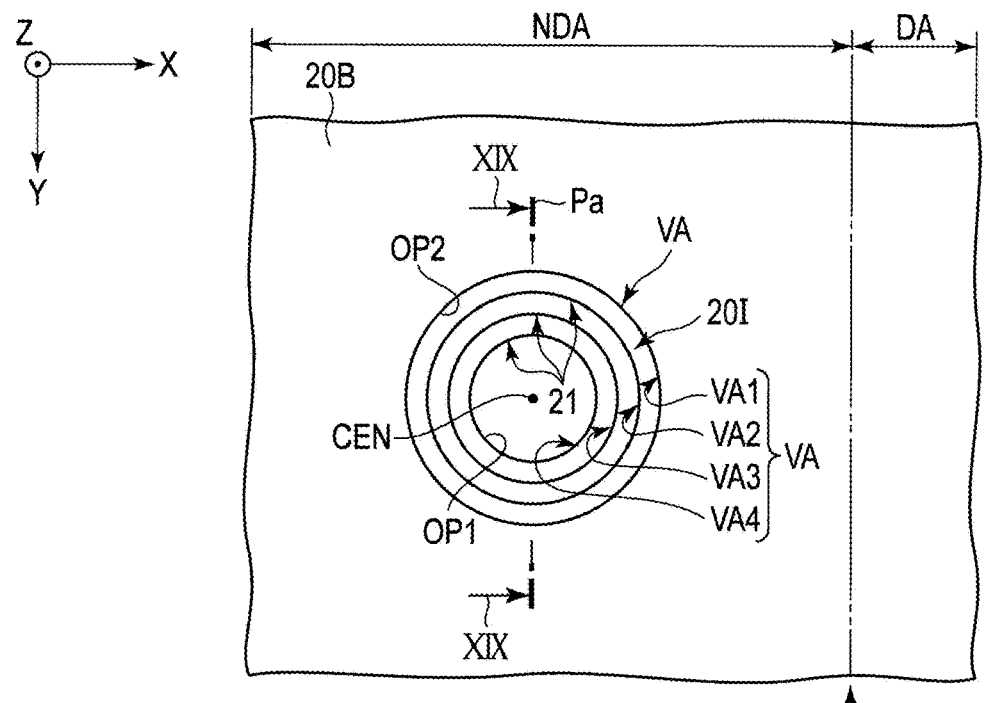
FIG. 18 is a plan view showing a first hole and a second surface in a display device according to a fourth embodiment.

As shown in FIG. 18, a first hole VA comprises a first part VA1, a second part VA2, a third part VA3 and a fourth part VA4. The first part VA1, the second part VA2, the third part VA3 and the fourth part VA4 are concentric circles. As seen in plan view, in the first hole VA, the first part VA1 is the largest, and the fourth part VA4 is the smallest.

Figure 19:
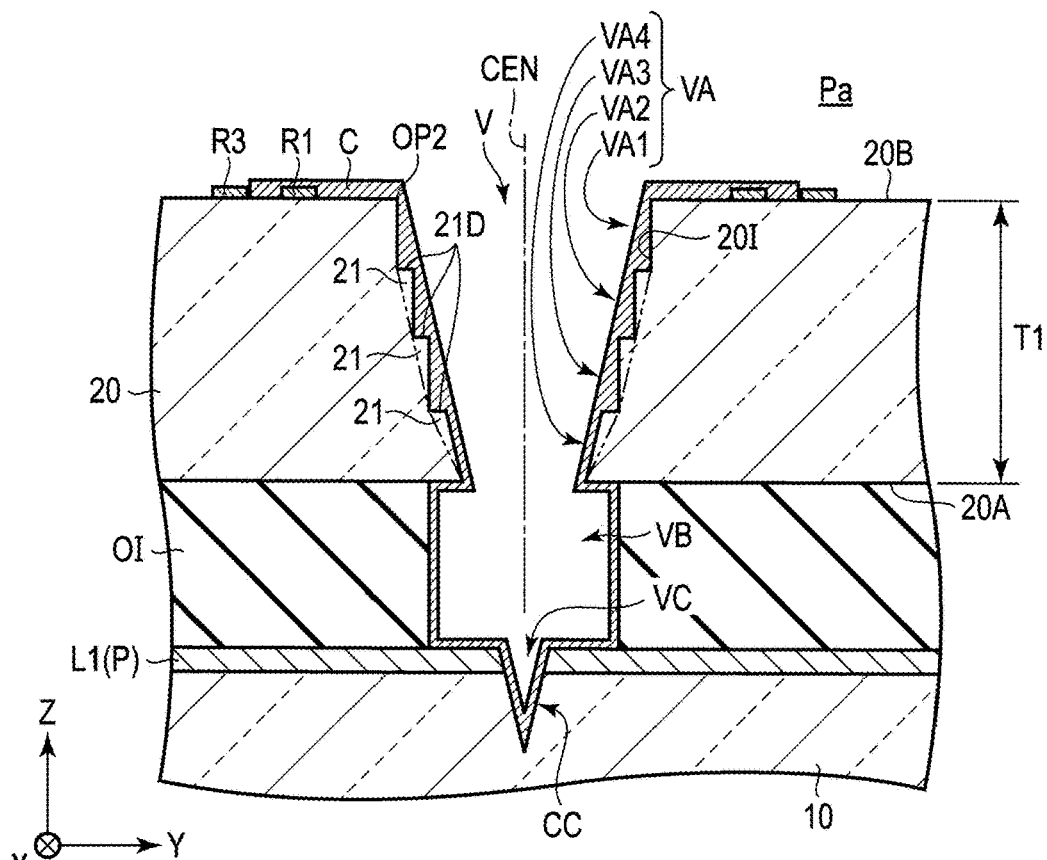
FIG. 19 is a cross-sectional view showing a display panel along the line XIX-XIX of FIG. 18.

As shown in FIG. 19, in the first hole VA, the first part VA1 is the closest to the second surface 20B side. The fourth part VA4 is the closest to the first surface 20A side. The second part VA2 is located between the first part VA1 and the fourth part VA4. The third part VA3 is located between the second part VA2 and the fourth part VA4.

A part of the inner circumferential surface 20I of a second basement 20 is formed by three first projections arranged along a central axis CEN. Each first projection comprises an upper surface 21D. In the present embodiment, three steps are formed on the inner circumferential surface 20I along the central axis CEN. However, in a manner different from that of the present embodiment, two, four or more steps may be formed on the inner circumferential surface 20I.

According to the display device DSP of the fourth embodiment having the above structure, a plurality of steps are formed on the inner circumferential surface 20I. When the film surface of a connecting material C is formed on the inner circumferential surface 20I, the steps (upper surfaces 21D) can further assuredly prevent the metal materials contained in the connecting material C from flowing in the direction of gravitational force.

Fifth Embodiment

A fifth embodiment is explained. The display device DSP of the fifth embodiment is different from that of the first embodiment in respect that a first projection 21 is formed of a material different from that of a second basement 20. FIG. 20 shows the cross-sectional shapes of a contact hole V, the first projection 21, etc. The illustration of a filling material H is omitted.

As shown in FIG. 20, the material of the first projection 21 is different from that of the second basement 20. The melting point of the material of the first projection 21 is less than that of the material of the second basement 20. For example, the first projection 21 is formed of resin such as polyethylene terephthalate (PET). The second basement 20 is formed of glass.

In the thickness direction of the second basement 20, the top end 21A of the first projection 21 is closer to a second surface 20B than one-half of the second basement 20. Thus, distance DI2 is less than one-half of thickness T1.

The first projection 21 has a ring shape, and is continuously formed around a central axis CEN. However, the first projection 21 may be discontinuously formed around the central axis CEN. The first projection is the projection closest to the central axis from the wall of the hole when it is viewed in the X-Y plane.

A protection material PF comprises a fifth hole VE. The fifth hole VE faces a first hole VA in a third direction Z. The fifth hole VE is wider than the first hole VA. The protection material PF comprises an inner surface SA in the fifth hole VE. The inner surface SA is spaced from a second opening end OP2. The fifth hole VE forms the contact hole V. A connecting material C is located in an area surrounded by the inner surface SA. For example, the connecting material C is in contact with the inner surface SA, and is in contact with the part surrounded by the inner surface SA in a terminal RT (second conductive layer L2).

Now, this specification explains a method for manufacturing the display device DSP of the present embodiment. Here, this specification explains the method from a step for forming the contact hole V to a step for forming the connecting material C.

Figure 21:
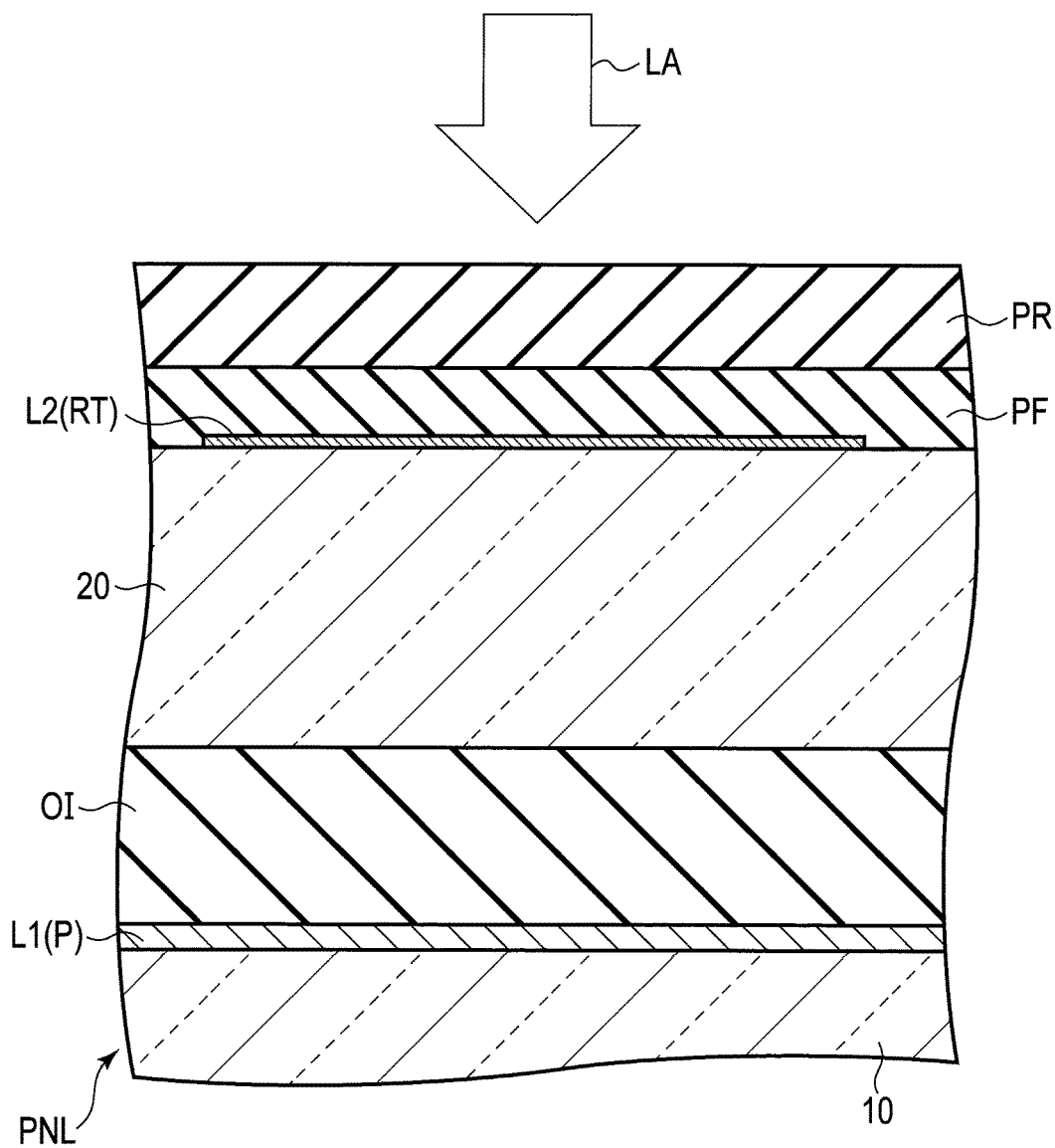
FIG. 21 is shown for explaining a method for manufacturing the display device of the fifth embodiment, and shows a state in which the display panel is irradiated with laser light while the display panel is manufactured.

As shown in FIG. 21, a display panel PNL is formed by stacking a first basement 10, a first conductive layer L1, an organic insulating layer OI, the second basement 20, the second conductive layer L2 and the protection material PF in this order. A protection sheet PR covers the protection material PF and protects the display panel PNL while the display panel PNL is manufactured. The material of the protection sheet PR is different from that of the second basement 20. The melting point of the material of the protection sheet PR is less than that of the material of the second basement 20. For example, the protection sheet PR is formed of resin such as PET. Before laser light LA is applied, the contact hole V is not formed in the display panel PNL, and further, no hole is formed in the protection sheet PR. As described above, the display panel PNL protected by the protection sheet PR is prepared.

Subsequently, laser light LA is applied to the protection sheet PR and the display panel PNL from the upper side of the protection sheet PR. In this way, a hole is formed in the protection sheet PR. The contact hole V connected to the hole of the protection sheet PR is formed in the display panel PNL. The terminal RT and the protection material PF are partially sublimed by the irradiation with laser light LA. Patterning is applied to the terminal RT and the protection material PF.

The melting point of the material of the protection sheet PR is less than that of the material of the second basement 20. Thus, when laser light LA is applied, the protection sheet PR is melted earlier than the second basement 20. The unmelted remains and a part of the melted components of the protection sheet PR are welded to and deposited on an inner circumferential surface 20I. In this way, the first projection 21 projecting to the central axis CEN side is formed.

In this step, the first projection 21 can be formed of the melted components (resin) of the protection sheet PR. In comparison with a case where the first projection 21 is formed of the melted components (glass) of the second basement 20, it is possible to prevent the damage caused to the second basement 20 such as a fracture in the second basement 20. For example, this effect is obtained because the thermal energy of the melted components of the protection sheet PR is less than that of the melted components of the second basement 20. In other words, the difference in temperature between the inner circumferential surface 20I and resinous components when the resinous components are welded to the inner circumferential surface 20I is less than that between the inner circumferential surface 20I and glass components when the glass components are welded to the inner circumferential surface 20I.

Subsequently, the protection sheet PR is removed from the display panel PNL in which the contact hole V is formed. Subsequently, a metal material is applied to the internal side of the contact hole V. Thus, the connecting material C is formed.

According to the display device DSP of the fifth embodiment having the above structure, the material of the first projection 21 can be different from that of the second basement 20. In the present embodiment, the first projection 21 can be formed, using the protection sheet PR as an indirect material which is temporarily used in the manufacturing process. In the present embodiment, effects similar to those of the other embodiments can be obtained.

Now, this specification explains techniques applicable to all the first to fifth embodiments.

For example, as shown in FIG. 22, the connecting material C may be in contact with a third conductive layer L3 as well as the first conductive layer L1 as the electrode on the first substrate SUB1 side. The first substrate SUB1 further comprises the third conductive layer L3. The third conductive layer L3 is formed between the second insulating layer 12 and the sealing member SE. For example, the third conductive layer L3 is formed of the same material at the same time as the metal layer M. The third conductive layer L3 is electrically connected to the first conductive layer L1. In the example shown in FIG. 22, the third conductive layer L3 is in contact with the first conductive layer L1 via a contact hole formed in the second insulating layer 12.

The contact hole V further comprises a fourth hole VD penetrating the third conductive layer L3. As seen in plan view, the area of the second hole VB is greater than that of the fourth hole VD. The third conductive layer L3 comprises a ring-like part RI which is covered with neither the second insulating layer 12 nor the sealing member SE. The connecting material C is in contact with the part RI of the third conductive layer L3. For example, the connecting material C is in contact with the inner circumferential surface RII, the upper surface RIT and the lower surface RIB of the part RI.

As described above, in the example shown in FIG. 22, the connecting material C is in contact with the third conductive layer L3 in addition to the first conductive layer L1. The area of contact can be increased by the area in which the connecting material C is in contact with the third conductive layer L3.

As shown in FIG. 23, the detection electrodes Rx1, Rx2, Rx3, . . . may extend in the second direction Y and may be arranged at intervals in the first direction X. The body portions RS extend in the second direction Y in the display area DA. The terminals RT1, RT2, RT3, . . . are located between the display area DA and the circuit board 3 and are arranged at intervals in the first direction X. The contact holes V1, V2, V3, . . . are arranged at intervals in the first direction X.

Sixth Embodiment

Figure 24:
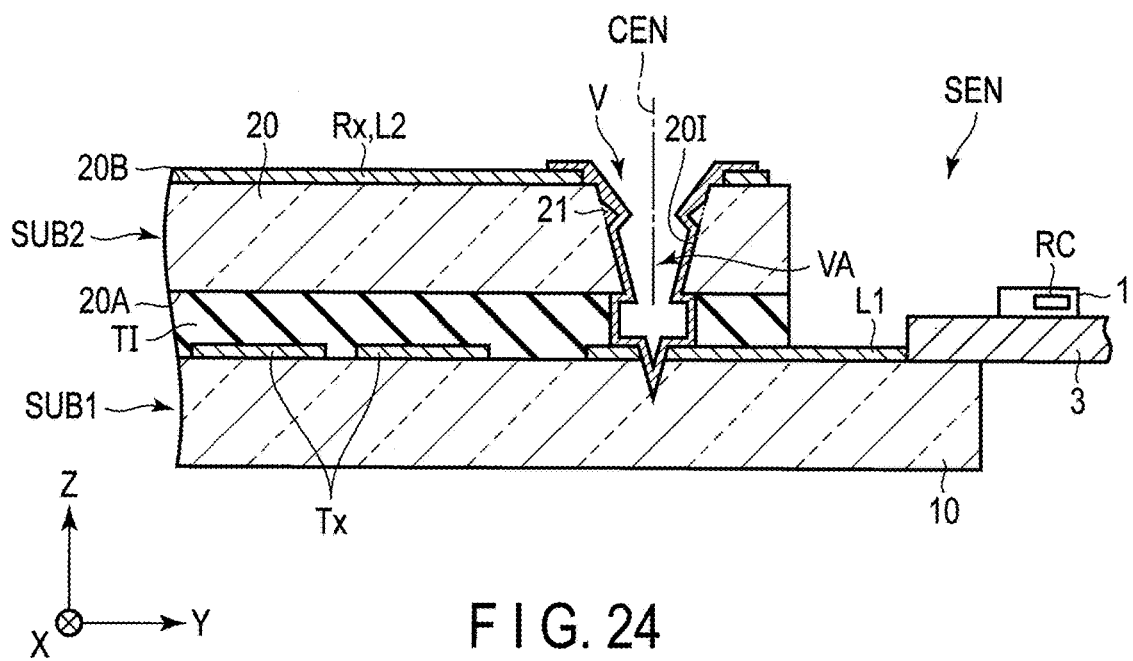
FIG. 24 is a cross-sectional view showing a structural example of a sensor device according to a sixth embodiment.

A sixth embodiment is explained. In the present embodiment, a sensor device is explained. FIG. 24 is a cross-sectional view showing a structural example of a sensor device SEN according to the sixth embodiment.

As shown in FIG. 24, the sensor device SEN comprises a first substrate SUB1, a second substrate SUB2, a transparent insulating layer TI, a connecting material C, a circuit board 3, an IC chip 1, etc.

The first substrate SUB1 comprises a first basement 10, a first conductive layer L1 and sensor drive electrodes Tx.

The second substrate SUB2 comprises a second basement 20 including a first hole VA, a first projection 21, and a detection electrode Rx (second conductive layer L2) provided on a second surface 20B. The first projection 21 forms a part of the inner circumferential surface 20I of the second basement 20 in the first hole VA, and projects to a central axis CEN. The transparent insulating layer TI is located between the first substrate SUB1 and the second substrate SUB2. For example, the transparent insulating layer TI is formed of a transparent organic insulating material. The first substrate SUB1 is bonded to the second substrate SUB2 with the transparent insulating layer TI.

In this example, the contact hole V is formed in the same manner as that of the first embodiment excluding the structure in which the contact hole V penetrates the transparent insulating layer TI instead of the organic insulating layer OI. The inner circumferential surface 20I of the second basement 20 is formed in the same manner as that of the first embodiment.

The connecting material C passes through the contact hole V (first hole VA), covers the surface of the first projection portion 21 and electrically connects the first conductive layer L1 and the detection electrode Rx.

In the sensor device SEN of the sixth embodiment having the above structure, for example, the inner circumferential surface 20I of the second basement 20 is formed in the same manner as that of the first embodiment. In the sixth embodiment, effects similar to those of the first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. It is possible to combine two or more embodiments if needed.

What is claimed is:

1. A display device comprising:
a first substrate comprising a first basement and a first conductive layer;
a second substrate comprising:
a second basement including:
a first surface facing the first conductive layer and located away from the first conductive layer;
a second surface on a side opposite to the first surface; and
a first hole penetrating a region from the second surface to the first surface;
a first projection formed on an inner circumferential surface of the first hole; and
a second conductive layer provided on the second surface;
a display function layer including a common electrode, wherein the common electrode is located between the first substrate and the second substrate; and
a connecting material which covers a surface of the first hole including the first projection and electrically connects the first conductive layer and the second conductive layer,
wherein the first projection is formed into a ring-shape in the first hole.

2. The display device of claim 1, wherein
on a virtual first perpendicular surface penetrating a central axis of the first hole and perpendicular to the first surface, a width of the first hole is gradually decreased from the second surface to the first surface.

3. The display device of claim 1, wherein
on a virtual first perpendicular surface penetrating a central axis of the first hole and perpendicular to the first surface, a width of the first hole on a side closer to the first surface than the first projection is less than the width of the first hole on a side closer to the second surface than the first projection.

4. The display device of claim 1, wherein
the first projection comprises a top end closest to a central axis of the first hole, and forms a constriction in the first hole, and
in a thickness direction of the second basement, the top end is located on the second surface side in comparison with one-half of the second basement.

5. The display device of claim 4, wherein
in the thickness direction, the top end is located in a depth of a quarter of the second basement from the second surface.

6. The display device of claim 1, wherein
the second basement and the first projection are integrally formed of a same material.

7. The display device of claim 1, wherein
the second substrate further comprises a second projection,
the first projection comprises an upper surface on the second surface side, and the second projection is provided on the upper surface of the first projection and projects to the second surface side.

8. The display device of claim 7, wherein the second basement, the first projection and the second projection are integrally formed.

9. The display device of claim 1, wherein the first projection is located on a virtual first perpendicular surface penetrating a central axis of the first hole and perpendicular to the first surface, and
the first projection is not located on a virtual second perpendicular surface penetrating the central axis, perpendicular to the first surface and different from the first perpendicular surface.

10. The display device of claim 1, wherein the first projection comprises a top end closest to a central axis of the first hole, a first end on the first surface side, and a second end on the second surface side, and forms a constriction in the first hole,
a first angle between a first reference line and a first straight line is less than a second angle between the first reference line and the second straight line,
a third angle between a second reference line and a third straight line is greater than a fourth angle between a third reference line and a fourth straight line,
the first reference line is a straight line passing through the first end and parallel to the first surface,
the first straight line is a line connecting the first end and the top end,
the second straight line is a line connecting the first end and a first opening end located on the first surface side of the first hole,
the second reference line is a straight line passing through the top end and parallel to the central axis,
the third straight line is a straight line connecting the top end and the second end,
the third reference line is a straight line passing through the second end and parallel to the central axis, and
the fourth straight line is a line connecting the second end and a second opening end located on the second surface side of the first hole.

11. The display device of claim 1, wherein a material of the first projection is different from a material of the second basement.

12. The display device of claim 11, wherein a melting point of the material of the first projection is lower than a melting point of the material of the second basement.

13. The display device of claim 1, wherein the second conductive layer comprises a detection electrode,
the detection electrode includes a body portion located in a display area, and a terminal located in a non-display area outside the display area and connected to the body portion, and
the connecting material is electrically connected to the terminal.

14. The display device of claim 13, further comprising a detection circuit which is electrically connected to the first conductive layer and reads a sensor signal output from the detection electrode.

15. The display device of claim 13, wherein the first substrate comprises a sensor drive electrode intersecting the body portion.

16. The display device of claim 1, further comprising a controller, wherein
the first substrate further comprises a pixel electrode and a sensor drive electrode between the first basement and the second substrate,
the second conductive layer comprises a detection electrode,
in a display period for displaying an image, the controller supplies an image signal to the pixel electrode and supplies a common signal to the sensor drive electrode, and
in a sensing period for performing sensing, the controller supplies a sensor drive signal to the sensor drive electrode and reads a sensor signal output from the detection electrode.

17. A sensor device comprising:
a first substrate comprising a first basement and a first conductive layer;
a second substrate comprising:
    a second basement including:
        a first surface facing the first conductive layer and located away from the first conductive layer;
        a second surface on a side opposite to the first surface; and
        a first hole penetrating a region from the second surface to the first surface;
    a first projection formed on an inner circumferential surface of the first hole; and
    a detection electrode provided on the second surface;
a transparent insulating layer located between the first substrate and the second substrate;
a connecting material which covers a surface of the first hole including the first projection and electrically connects the first conductive layer and the detection electrode; and
a detection circuit which reads a sensor signal output from the detection electrode,
the first projection comprises a top end closest to a central axis of the first hole, and forms a constriction in the first hole, and
in a thickness direction of the second basement, the top end is located on the second surface side in comparison with one-half of the second basement.

* * * * *